(12) United States Patent
Hsieh et al.

(10) Patent No.: US 11,288,019 B2
(45) Date of Patent: Mar. 29, 2022

(54) MEMORY MANAGEMENT METHOD AND STORAGE CONTROLLER

(71) Applicant: Shenzhen EpoStar Electronics Limited CO., Shenzhen (CN)

(72) Inventors: Hung-Chih Hsieh, Hsinchu County (TW); Hsiu-Hsien Chu, Hsinchu (TW); Yu-Hua Hsiao, Hsinchu County (TW)

(73) Assignee: Shenzhen EpoStar Electronics Limited CO., Shenzhen (CN)

( * ) Notice: Subject to any disclaimer, the term of this patent is extended or adjusted under 35 U.S.C. 154(b) by 447 days.

(21) Appl. No.: 16/059,039

(22) Filed: Aug. 9, 2018

(65) Prior Publication Data
US 2019/0332331 A1 Oct. 31, 2019

(30) Foreign Application Priority Data

Apr. 30, 2018 (TW) ................................ 107114631

(51) Int. Cl.
*G06F 3/06* (2006.01)
*G06F 12/06* (2006.01)
*G06F 12/02* (2006.01)

(52) U.S. Cl.
CPC .......... *G06F 3/0688* (2013.01); *G06F 3/0604* (2013.01); *G06F 3/0617* (2013.01); *G06F 12/0246* (2013.01); *G06F 12/06* (2013.01)

(58) Field of Classification Search
CPC ..... G06F 3/0688; G06F 12/0246; G06F 12/06
See application file for complete search history.

(56) References Cited

U.S. PATENT DOCUMENTS

| 6,381,176 | B1* | 4/2002 | Kim | G06F 12/0246 365/185.11 |
|---|---|---|---|---|
| 8,423,838 | B2* | 4/2013 | Yeh | G06F 12/0246 714/710 |
| 9,443,616 | B2* | 9/2016 | Chen | G11C 29/44 |
| 9,965,201 | B1* | 5/2018 | Bono | G06F 3/0667 |
| 2005/0144512 | A1* | 6/2005 | Ming | G06F 11/1076 714/6.12 |
| 2010/0042774 | A1* | 2/2010 | Yang | G06F 12/0246 711/103 |
| 2010/0228940 | A1* | 9/2010 | Asnaashari | G06F 12/0246 711/170 |

* cited by examiner

*Primary Examiner* — Jason W Blust
*Assistant Examiner* — Eric T Loonan
(74) *Attorney, Agent, or Firm* — JCIPRNET

(57) ABSTRACT

A memory management method for a storage device having a rewritable non-volatile memory module is provided. The rewritable non-volatile memory module has a plurality of physical blocks. The method includes: scanning the plurality of physical blocks to identify one or more bad physical blocks; performing a bad physical block remapping operation on the one or more bad physical blocks to update a virtual block stripe management table; and performing a writing operation under a multiple plane write mode based on the virtual block stripe management table.

16 Claims, 9 Drawing Sheets

MEMORY MANAGEMENT METHOD AND STORAGE CONTROLLER

CROSS-REFERENCE TO RELATED APPLICATION

This application claims the priority benefit of Taiwan application serial no. 107114631, filed on Apr. 30, 2018. The entirety of the above-mentioned patent application is hereby incorporated by reference herein and made a part of this specification.

BACKGROUND OF THE INVENTION

Field of the Invention

The invention relates to a memory management method, and particularly relates to a management method and a storage controller for a storage device having a rewritable non-volatile memory module.

Description of Related Art

Generally speaking, if a rewritable non-volatile memory module has a bad physical block, the block stripe to which the bad physical block belongs may not be available for data writing under a multiple plane write mode, or the block stripe to which the bad physical block belongs may be set as unusable.

Therefore, if the rewritable non-volatile memory module has a plurality of dispersed bad physical blocks, the writing efficiency of the rewritable non-volatile memory module may drop (as the multiple plane write mode is unavailable for data writing), or the overall available space of the rewritable non-volatile memory module may be reduced (as the block stripes to which the bad physical blocks belong may be set as unusable).

Therefore, finding out how to manage the bad physical blocks dispersed in the rewritable non-volatile memory module and reduce the adverse effect of the bad physical blocks on the overall data accessing efficiency and/or the space for use of the rewritable non-volatile memory module is now an issue for people having ordinary skill in the art to work on.

SUMMARY OF THE INVENTION

The invention provides a memory management method and a storage controller for a storage device having a rewritable non-volatile memory module. The memory management method and the storage controller are capable of performing remapping on an identified bad block to obtain a greater number of virtual block stripes available for a multiple plane write mode and thereby improve a data accessing efficiency of the storage device.

An embodiment of the invention includes a memory management method for a storage device having a rewritable non-volatile memory module. The rewritable non-volatile memory module has a plurality of physical blocks, the physical blocks are divided into N planes, and each of the N planes has M physical blocks corresponding to M block stripes and ordered based on a first order. M and N are positive integers. The method includes: scanning the physical blocks to identify one or more bad physical blocks from the physical blocks; performing a bad physical block remapping operation on the one or more bad physical blocks to update a virtual block stripe management table; and perform a writing operation under a multiple plane write mode based on the virtual block stripe management table. The bad physical block remapping operation includes: determining whether there is one or more available physical blocks ordered after a $j^{th}$ physical block in an $i^{th}$ plane of the N planes if the $j^{th}$ physical block in the $i^{th}$ plane is identified as a bad physical block, wherein i is a positive integer less than or equal to N, and j is a positive integer less than or equal to M, wherein if it is determined that there are the one or more available physical blocks ordered after the $j^{th}$ physical block in the $i^{th}$ plane, a last available physical block in the one or more available physical blocks is chosen based on the first order as a sacrificed physical block for fixing the $j^{th}$ physical block, and mapping information corresponding to the $j^{th}$ physical block recorded in the virtual block stripe management table is updated based on a physical address of the sacrificed physical block to complete the bad physical block remapping operation corresponding to the $j^{th}$ physical block, wherein the mapping information corresponding to the $j^{th}$ physical block indicates that a physical address of the $j^{th}$ physical block is replaced by the physical address of the sacrificed physical block.

An embodiment of the invention provides a storage controller. The storage controller controls a storage device including a rewritable non-volatile memory module. The storage controller includes a connection interface circuit, a memory interface control circuit, a block stripe management circuit unit, and a processor. The connection interface circuit is coupled to a host system. The memory interface control circuit is coupled to the rewritable non-volatile memory module, the rewritable non-volatile memory module has a plurality of physical blocks, the physical blocks are divided into N planes, and each of the N planes has M physical blocks corresponding to M block stripes and ordered based on a first order. In addition, M and N are positive integers. The block stripe management circuit unit scans the physical blocks to identify one or more bad physical blocks from the physical blocks. The block stripe management circuit unit further performs a bad physical block remapping operation on the one or more bad physical blocks to update a virtual block stripe management table. The processor instructs the memory interface control circuit to perform a writing operation under a multiple plane write mode based on the virtual block stripe management table. The bad physical block remapping operation includes the following: The block stripe management circuit unit determines whether there is one or more available physical blocks ordered after a $j^{th}$ physical block in an $i^{th}$ plane of the N planes if the $j^{th}$ physical block in the $i^{th}$ plane is identified as a bad physical block, wherein i is a positive integer less than or equal to N, and j is a positive integer less than or equal to M. If it is determined that there are the one or more available physical blocks ordered after the $j^{th}$ physical block in the $i^{th}$ plane, the block stripe management circuit unit chooses a last available physical block in the one or more available physical blocks based on the first order as a sacrificed physical block for fixing the $j^{th}$ physical block, and updates mapping information corresponding to the $j^{th}$ physical block recorded in the virtual block stripe management table based on a physical address of the sacrificed physical block to complete the bad physical block remapping operation corresponding to the $j^{th}$ physical block. In addition, the mapping information corresponding to the $j^{th}$ physical block indicates that a physical address of the $j^{th}$ physical block is replaced by the physical address of the sacrificed physical block.

Based on the above, the embodiments of the invention provide the memory management method and the storage controller capable of scanning and identifying a bad physical block, performing the bad physical block remapping operation on the identified bad physical block to update the virtual block stripe management table, and perform a writing operation under the multiple plane write mode based on the virtual block stripe management table, so as to generate multiple virtual block stripes available for the multiple plane write mode. Accordingly, the data accessing efficiency and the space of the storage device are increased.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the present embodiment, a storage device includes a rewritable non-volatile memory module and a storage device controller (which is also referred to as a storage controller or a storage control circuit). Moreover, the storage device is used together with a host system, and the host system may write data into the storage device or read data from the storage device.

Figure 1:
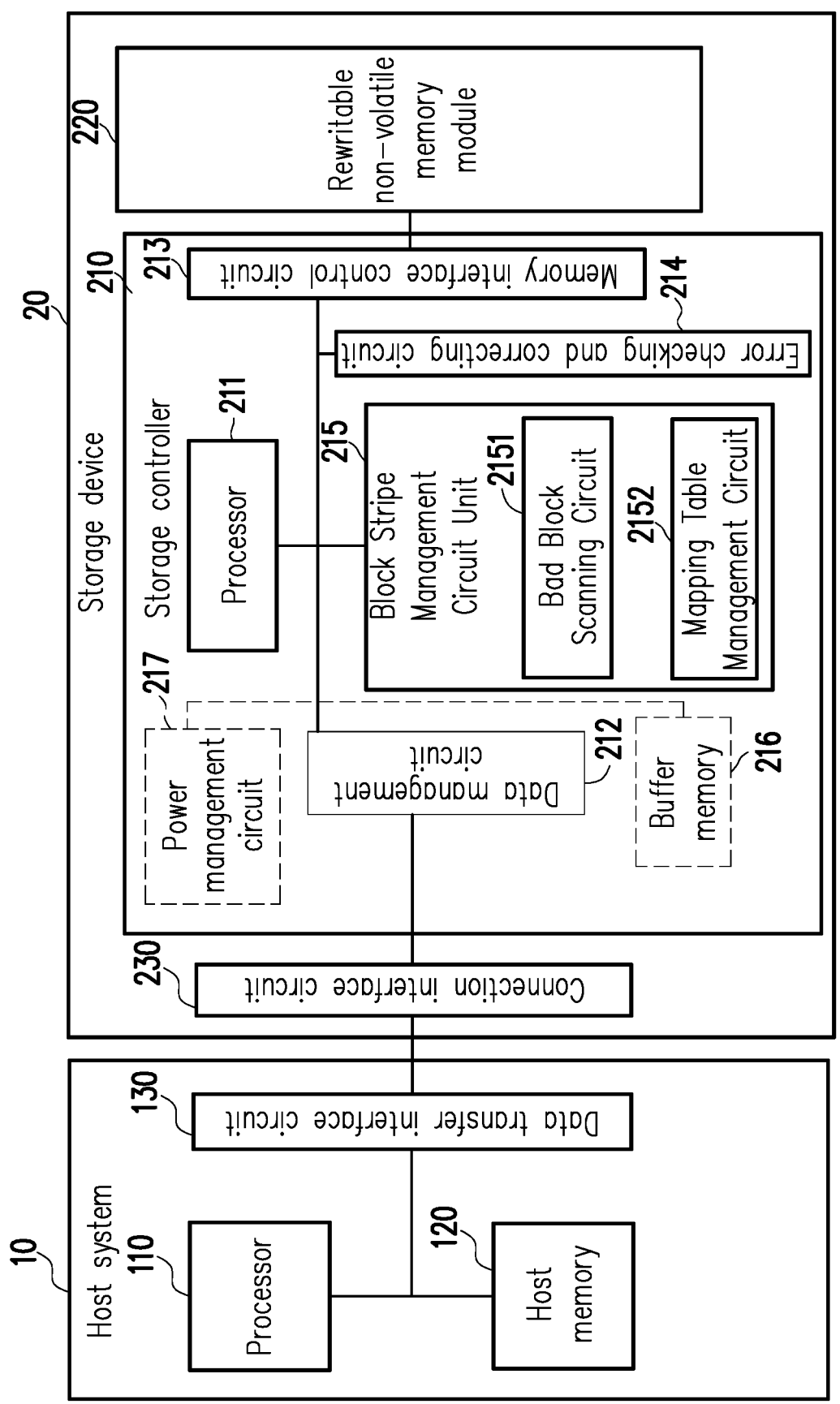
FIG. 1 is a schematic block diagram of a host system and a storage device according to an embodiment of the invention.

FIG. 1 is a schematic block diagram of a host system and a storage device according to an embodiment of the invention.

Referring to FIG. 1, the host system 10 includes a processor 110, a host memory 120 and a data transfer interface circuit 130. In the present embodiment, the data transfer interface circuit 130 is coupled to (i.e., electrically connected to) the processor 110 and the host memory 120. In another embodiment, the processor 110, the host memory 120 and the data transfer interface circuit 130 are coupled to each other through a system bus.

The storage device 20 includes a storage controller 210, a rewritable non-volatile memory module 220 and a connection interface circuit 230. The storage controller 210 includes a processor 211, a data transfer management circuit 212 and a memory interface control circuit 213.

In the present embodiment, the host system 10 is coupled to the storage device 20 through the data transfer interface circuit 130 and the connection interface circuit 230 of the storage device 20 to implement a data access operation. For example, the host system 10 may store data to the storage device 20 or read data from the storage device 20 through the data transfer interface circuit 130.

In the present embodiment, the processor 110, the host memory 120 and the data transfer interface circuit 130 may be disposed on a motherboard of the host system 10. The number of the data transfer interface circuit 130 may be one or plural. Through the data transfer interface circuit 130, the motherboard may be coupled to the storage device 20 through a wired or wireless manner. The storage device 20 is, for example, a flash drive, a memory card, a solid state disk (SSD) or a wireless memory storage device. The wireless memory storage device is, for example, a memory storage device based on various wireless communication techniques such as a near field communication (NFC) memory storage device, a WiFi memory storage device, a Bluetooth memory storage device or a low power consumption Bluetooth memory storage device (for example, iBeacon), etc. Moreover, the motherboard may also be coupled to a global positioning system (GPS) module, a network interface card, a wireless transmission device, or various I/O devices such as a keyboard, a screen, a mouse, a loudspeaker, etc. through the system bus.

In the present embodiment, the data transfer interface circuit 130 and the connection interface circuit 230 are interface circuits compatible to a peripheral component interconnect express (PCI express) standard. Moreover, the data transfer interface circuit 130 and the connection interface circuit 230 use a non-volatile memory express (NVMe) communication protocol in between to perform data transmission.

However, it should be noted that the invention is not limited thereto, and the data transfer interface circuit 130 and the connection interface circuit 230 may also be compliant with a parallel advanced technology attachment (PATA) standard, an institute of electrical and electronics engineers (IEEE) 1394 standard, a serial advanced technology attachment (SATA) standard, a universal serial bus (USB) standard, a SD interface standard, an ultra high speed-I (UHS-I) interface standard, an ultra high speed-II (UHS-II) interface standard, a memory stick (MS) interface standard, a multi-chip package interface standard, a multi media card (MMC) interface standard, an eMMC interface standard, a universal flash storage (UFS) interface standard, an eMCP interface standard, a CF interface standard, an integrated device electronics (IDE) standard or other suitable standards. Moreover, in another embodiment, the connection interface circuit 230 and the storage controller 210 may be packaged in one chip, or the connection interface circuit 230 is disposed outside a chip containing the storage controller 210.

In the present embodiment, the host memory 120 is used for temporarily storing a command or data executed by the processor 110. For example, in the present exemplary embodiment, the host memory 120 may be a dynamic random access memory (DRAM), a static random access memory (SRAM), etc. However, it should be noted that the invention is not limited thereto, and the host memory 120 may also be other suitable memory.

The storage controller 210 is used for executing a plurality of logical gates or control commands implemented in a hardware form or firmware form, and performing data writing, reading, and erasing operations on the rewritable non-volatile memory module 220 according to commands of the host system 10.

To be more specific, the processor 211 of the storage controller 210 is hardware having computation capability, and is used for controlling a whole operation of the storage controller 210. Specifically, the processor 211 has a plurality of control commands, and when the storage device 200 operates, the control commands are executed for the data writing, reading and erasing operations.

It should be noted that in the present embodiment, the processor 110 and the processor 211 are, for example, central processing units (CPU), micro-processors or other programmable microprocessors, digital signal processors (DSP), programmable controllers, application specific integrated circuits (ASIC), programmable logic devices (PLD) or other similar circuit devices, which are not limited by the invention.

In an embodiment, the storage controller 210 further has a read-only memory (not shown) and a random access memory (not shown). Particularly, the read-only memory has a boot code, and when the storage controller 210 is enabled, the processor 211 firstly executes the boot code to load the control commands stored in the rewritable non-volatile memory module 220 to the random access memory of the storage controller 210. Afterwards, the processor 211 may execute the control commands to perform the data writing, reading and erasing operations. In another embodiment, the control commands of the processor 211 may also be stored in a specific area of the rewritable non-volatile memory module 220 (for example, a physical storage unit in the rewritable non-volatile memory module 220 used for storing system data) in form of program code.

In the present embodiment, as described above, the storage controller 210 further includes the data transfer management circuit 212 and the memory interface control circuit 213. It should be noted that the operations executed by the components of the storage controller 210 may also be regarded as operations executed by the storage controller 210.

The data transfer management circuit 212 is coupled to the processor 211, the memory interface control circuit 213 and the connection interface circuit 230. The data transfer management circuit 212 is used for receiving instructions of the processor 211 to perform data transfer. For example, data is read from the host system 10 (for example, the host memory 120) through the connection interface circuit 230, and the read data is written into the rewritable non-volatile memory module 220 through the memory interface control circuit 213 (for example, the writing operation is performed according to a writing command coming from the host system 10). For another example, data may be read from one or more physical units of the rewritable non-volatile memory module 220 (the data may be read from one or more memory cells of the one or more physical units) through the memory interface control circuit 213, and the read data is written to the host system 10 (for example, the host memory 120) through the connection interface circuit 230 (for example, the reading operation is performed according to a reading command coming from the host system 10). In another embodiment, the data transfer management circuit 212 may also be integrated into the processor 211.

The memory interface control circuit 213 receives an instruction of the processor 211, and performs the writing (also referred to as programming) operation, reading operation or erasing operation to the rewritable non-volatile memory module 220 in collaboration with the data transfer management circuit 212.

For example, the processor 211 may execute a writing command sequence to instruct the memory interface control circuit 213 to write data to the rewritable non-volatile memory module 220. The processor 211 may execute a reading command sequence to instruct the memory interface control circuit 213 to read data from one or more physical units, corresponding to the reading command, of the rewritable non-volatile memory module 220. The processor 211 may execute an erasing command sequence to instruct the memory interface control circuit 213 to perform an erasing operation to the rewritable non-volatile memory module 220. The writing command sequence, the reading command sequence and the erasing command sequence may respectively include one or more program codes or command codes and instruct to perform the corresponding writing, reading and erasing operation to thee writable non-volatile memory module 220. In an embodiment, the memory interface control circuit 213 may execute corresponding operations (e.g., a bad block scanning operation, a loss balancing operation, a garbage collecting operation, and/or the like) based on other command sequences that are received. These command sequences may include one or more signals, or data on a bus. These signals or data may include command codes or program codes. For example, the reading command sequence may include information such as a read identification code, a memory address, etc., and the writing command sequence may include information such as a logical address to be written, write data, and a write mode to be used (e.g., a single plane write mode or a multiple plane write mode), etc.

Moreover, data to be written into the rewritable non-volatile memory module 220 is converted into a format that is acceptable to the rewritable non-volatile memory module 220 by the memory interface control circuit 213.

The rewritable non-volatile memory module 220 is coupled to the storage controller 210 (the memory interface control circuit 213) and stores data written by the host system 10. The rewritable non-volatile memory module 220 may be a single level cell (SLC) NAND flash memory module (i.e., a flash memory module where one memory cell may store 1 bit), a multi level cell (MLC) NAND flash memory module (i.e., a flash memory module where one memory cell may store 2 bits), a triple level cell (TLC) NAND flash memory module (i.e., a flash memory module where one memory cell may store 3 bits), a quadruple level cell (QLC) NAND flash memory module (i.e., a flash memory module where one memory cell stores four bits), a 3D NAND flash memory module or a vertical NAND flash memory module, etc., or other memory modules having the same characteristics. The memory cells in the rewritable non-volatile memory module 220 are arranged in an array.

In the present embodiment, the rewritable non-volatile memory module 220 has a plurality of word lines, and each of the word lines includes a plurality of memory cells. The memory cells on a same word line may construct one or more physical programming units (physical pages). In addition, the physical programming units may form a physical unit (a physical block or a physical erasing unit). The present embodiment takes the TLC NAND flash memory module as an example. In other words, in the following embodiment, a memory cell that may store three bit values may serve as a physical programming unit (i.e., in each programming operation, a programming voltage is applied to one physical programming unit after another to program data). In addition, each of the respective memory cells may be divided into a lower physical page, a middle physical page, and an upper physical page, each storing one bit value.

In the embodiment, the memory cell is the smallest unit for data writing (programming). The physical unit is the smallest unit for erasing. In other words, each physical unit contains the minimum number of memory cells to be erased together. Each physical unit has a plurality of memory cells.

In the following embodiment, an example where one physical block serves as one physical unit is described. However, in another embodiment, one physical unit may also be formed by an arbitrary number of memory cells, depending on the practical needs. Besides, it should be understood that when the processor 211 groups the memory cells (or physical units) in the rewritable non-volatile memory module 220 to perform a corresponding management operation, the memory cells (or physical units/physical blocks) are logically grouped, while the physical positions of the memory cells remain the same.

Figure 3:
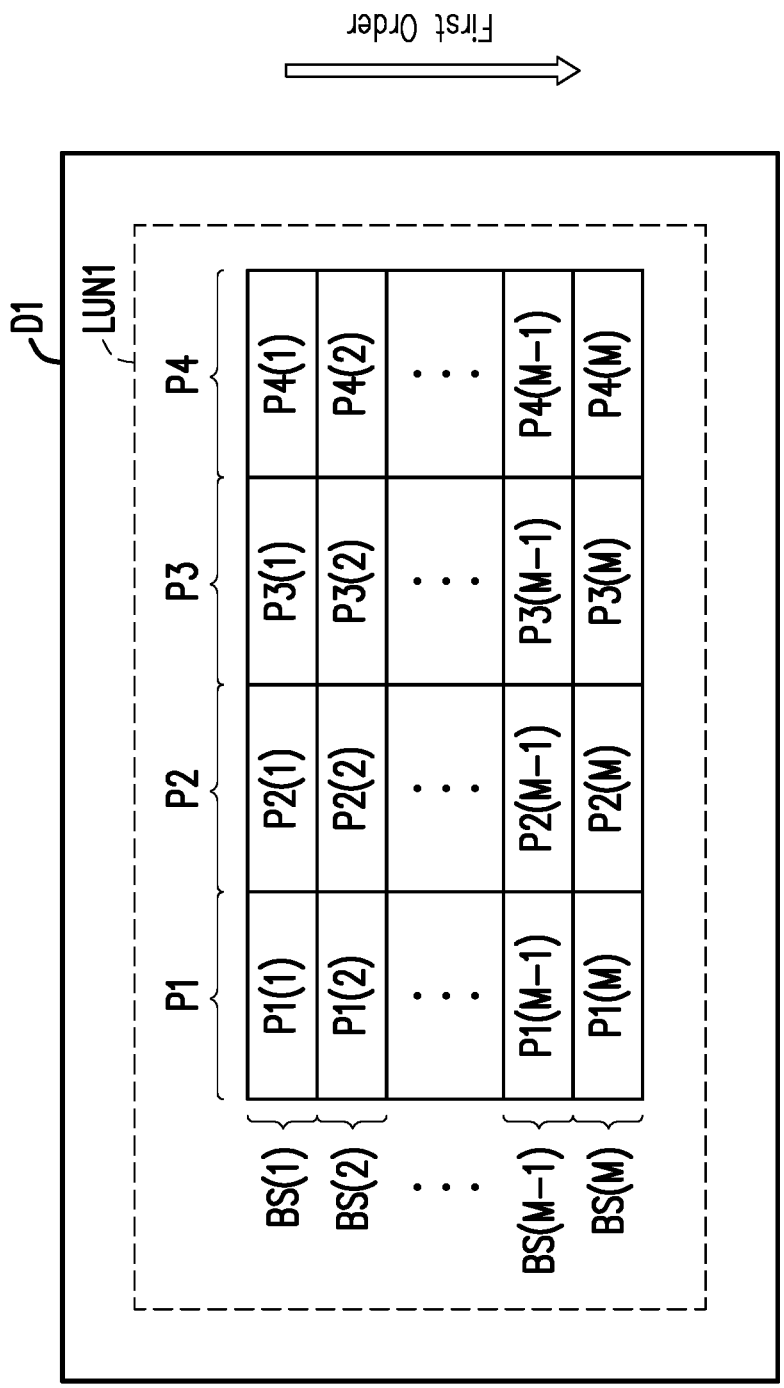
FIG. 3 is a schematic view illustrating a plurality of block stripes of a rewritable non-volatile memory module according to an embodiment of the invention.

FIG. 3 is a schematic view illustrating a plurality of block stripes of a rewritable non-volatile memory module according to an embodiment of the invention.

Referring to FIG. 3, more specifically, the rewritable non-volatile memory module 220 may have a plurality of packages. Each of the packages may have a plurality of physical blocks. The physical blocks may be divided into N planes, and part or all of the planes may be logically divided into a logical unit number (LUN). For the ease of description, it is assumed that the rewritable non-volatile memory module 220 has a package D1, and the package D1 has a plurality of physical blocks. The physical blocks are divided (grouped) into four planes P1 to P4 (i.e., N=4), and the four planes are divided into a logical unit number LUN1. In addition, each of the planes has M physical units ordered based on a first order. For example, the plane P1 has M physical blocks P1(1) to P1(M), the plane P2 has M physical blocks P2(1) to P2(M), the plane P2 has M physical blocks P3(1) to P3(M), and the plane P4 has M physical blocks P4(1) to P4(M). In the embodiment, the physical blocks ordered at the same position in the respective planes form a block stripe. For example, a block stripe BS(1) includes a physical block P1(1), a physical block P2(1), a physical block P3(1), and a physical block P4(1). In other words, all the physical blocks in the above four planes may form M block stripes BS(1) to BS(M) ordered in the first order.

In the embodiment, the storage controller 210 sequentially writes data based on the order of the block stripes. For example (first example), assuming that all the block stripes are blank, in order to write data that fills four physical blocks, the storage controller 210 may start from the first blank block stripe (the block stripe BS(1) in the current example) based on the first order and store the write data to all the physical blocks (e.g., the physical block P1(1), the physical block P2(1), the physical block P3(1), and the physical block P4(1)) of the first blank block stripe. In another example (second example), assuming that the physical block P1(1) of the block stripe BS(1) is unavailable for storing data, while other physical blocks are available to store the write data, the storage controller 210 may store the write data to the physical block P2(1), the physical block P3(1), and the physical block P4(1) of the block stripe BS(1) and the physical block P1(2) of the block stripe BS(2).

In the embodiment, if all the physical blocks respectively corresponding to all the planes in the block stripe to be written are available for storing data (e.g., blank), the storage controller 210 may adopt the multiple plane write mode to store the write data to the block stripe (also referred to as "performing a multiple plane write operation on the block strip"). The multiple plane write mode may also be referred to as a full plane write mode. For instance, in the first example above, the storage controller 210 may adopt the multiple plane write mode to store the write data.

Alternatively, if one or more physical blocks (e.g., damaged physical blocks, bad physical blocks, or physical blocks already storing data) of all the physical blocks respectively corresponding to all the planes in the block stripe to be written are unavailable for storing data, the storage controller 210 may adopt the single plane write mode to store the write data to the block stripe (also referred to as "performing a single plane write mode to the block strip"). For instance, in the second example above, the storage controller 210 may adopt the single plane write mode to store the write data.

More specifically, assuming that the storage controller 210 adopts the multiple plane write mode to store the write data to the four physical blocks P1(1), P2(1), P3(1), and P4(1) of the block stripe BS(1) respectively corresponding to the planes P1 to P4 (e.g., the first example above), the storage controller 210 may divide the data into four write sub-data, and respectively store the four write sub-data into write registers first corresponding to the four planes P1 to P4. Then, the storage controller may send only one programming command to write the four write sub-data into the four physical blocks P1(1), P2(1), P3(1), and P4(1) in one step.

Alternatively, assuming that the storage controller 210 adopts the single plane write mode to store the three physical blocks P2(1), P3(1), and P4(1) respectively corresponding to the planes P2 to P4 in the block stripe BS(1) and the physical block P1(2) corresponding to the plane P1 in the block stripe BS(2) (e.g., the second example), the storage controller 210 may divide the write data into four write sub-data, and respectively store the four write sub-data into the write registers corresponding to the planes P1 to P4. Then, the storage controller 210 needs to sequentially send four programming commands to separately store the four write sub-data to the physical block P2(1), P3(1), P4(1), and P1(2). The operations sequentially include the following: the storage controller 210 sends a programming command to write the write sub-data stored in the write register of the plane P2 to the physical block P2(1); the storage controller 210 sends a programming command to write the write sub-data stored in the write register of the plane P3 to the physical block P3(1); the storage controller 210 sends a programming command to write the write sub-data stored in the write register of the plane P4 to the physical block P4(1); and the storage controller 210 sends a programming command to write the write sub-data stored in the write register of the plane P1 to the physical block P1(2).

In other words, even if the size of the write data is the same, the time consumed by the programming operations for storing the write data under the single plane write mode is more than the time consumed by the programming operation for storing the write data under the multiple plane write mode. It should be noted that, ss described above, except for physical blocks with data already written normally, damaged physical blocks (also referred to as "bad physical blocks") may force the storage controller 210 to adopt the single plane write mode to store the write data. As a result, the time consumed for the writing operation is increased. Namely, the efficiency of the writing operation is reduced. The memory management method of the embodiment may reduce the adverse effect of the bad physical blocks.

The applicable conditions of the multiple plane write mode and the single plane write mode and other details and relations of the modes with the block stripes are already well known by people having ordinary skills in the art and not the focus of the invention. Therefore, such contents will not be reiterated in the following.

The storage controller 210 may assign a plurality of logical units to the rewritable non-volatile memory module 220. The host system 10 may access user data stored in the physical units through the assigned logical units. Here, each logical unit may be formed by one or more logical addresses. For example, the logical unit may be a logical block, a logical page, or a logical sector. Each logical unit may be mapped to one or more physical units. In addition, the logical unit may be one or more physical addresses, one or more physical sectors, one or more physical programming units, or one or more physical erasing units. In the embodiment, the logical unit is a logical block, and a logical sub-unit is a logical page. Each logical unit has a plurality of logical sub-units.

Besides, the storage controller 210 may build a logical to physical address mapping table and a physical to logical address mapping table to record the mapping relations between the logical units (e.g., logical blocks, logical pages, or logical sectors) assigned to the rewritable non-volatile memory module 220 and the physical units (e.g., physical erasing units, physical programming units, or physical sectors). In other words, the storage controller 210 may look for a physical unit mapped to a logical unit based on the logical to physical address mapping table, and the storage controller 210 may look up a logical unit mapped to a physical unit based on the physical to logical address mapping table. However, the technical concepts concerning mapping between the logical units and physical units are common technical means familiar to people having ordinary skills in the art. Thus, details in this regard will not be further described in the following.

In the embodiment, an error checking and correcting circuit 214 is coupled to the processor 211 and used for performing an error checking and correcting operation to ensure the accuracy of data. Specifically, when the processor 211 receives a writing command from the host system 10, the error checking and correcting circuit 214 may generate a corresponding error correcting code (ECC) and/or error detecting code (EDC). In addition, the processor 211 may write the data and the corresponding ECC and/or EDC to the rewritable non-volatile memory module 220. Afterwards, when reading data from the rewritable non-volatile memory module 220, the processor 211 may also read the ECC or EDC corresponding to the data, and the error checking and correcting circuit 214 may perform the error checking and correcting operation to the read data based on the ECC and/or EDC. Moreover, after the error checking and correcting operation, if the read data is successfully decoded, the error checking and correcting circuit 214 may return an error bit value to the processor 211.

In an embodiment, the storage controller 210 may further include a buffer memory 216 and a power management circuit 217. The buffer memory is coupled to the processor 211 and used for temporarily storing data and commands from the host system 10, data from the rewritable non-volatile memory module 220, or other system data used for managing the storage device 20. Accordingly, the processor 211 may quickly access the data, the command, or the system data from the buffer memory 216. The power management circuit 217 is coupled to the processor 211 and used for controlling power of the storage device 20.

In the embodiment, a block stripe management circuit unit 215 includes a bad block scanning circuit 2151 and a mapping table management circuit 2152. The block stripe management circuit unit 215 sets up/updates a plurality of virtual block stripes and a corresponding virtual block stripe management table (e.g., a bad physical block remapping operation to be described in the following) based on the identified bad physical block. In this way, the identified bad physical block may be fixed through the bad physical block remapping operation performed on the bad physical block, and the adverse effect of the bad physical block may thus be reduced.

In the embodiment, the processor 211 may instruct the bad block scanning circuit 2151 in the block stripe management circuit unit 215 to perform the bad physical block scanning operation at one of the following timings: (1) when the storage device 20 is not occupied (i.e., when the storage device 20 is idling over a predetermined time threshold); (2) at the time when the storage device is turned on; and (3) when the number of error bits of data read from a physical block exceeds an error bit number threshold. The operation may scan all or some specific (e.g., the physical block meeting (3) above) physical blocks to determine whether the scanned physical block is a bad physical block. In addition, the bad block scanning circuit 2151 may identify the physical address (or identification code) of the physical block determined as a bad physical block. In another embodiment, the processor 211 may choose a physical block in a worse physical state (e.g., a physical block having a greater number of program erase cycles or a greater error bit number) as the physical block to be scanned based on one or a combination of the statistics values and the error bit numbers of all the physical blocks. In an embodiment, the processor 211 may also randomly choose a target physical block to perform the bad physical block scanning operation. Details of the bad physical block scanning operation are technical means that people having ordinary skills in the art are familiar with, and thus will not be reiterated in the following.

In the following, details concerning the memory management method, how the block stripe management circuit unit 215 carries out the bad physical block remapping operation, and the function of the mapping table management circuit 2152 are described with reference to the drawings.

Figure 2:
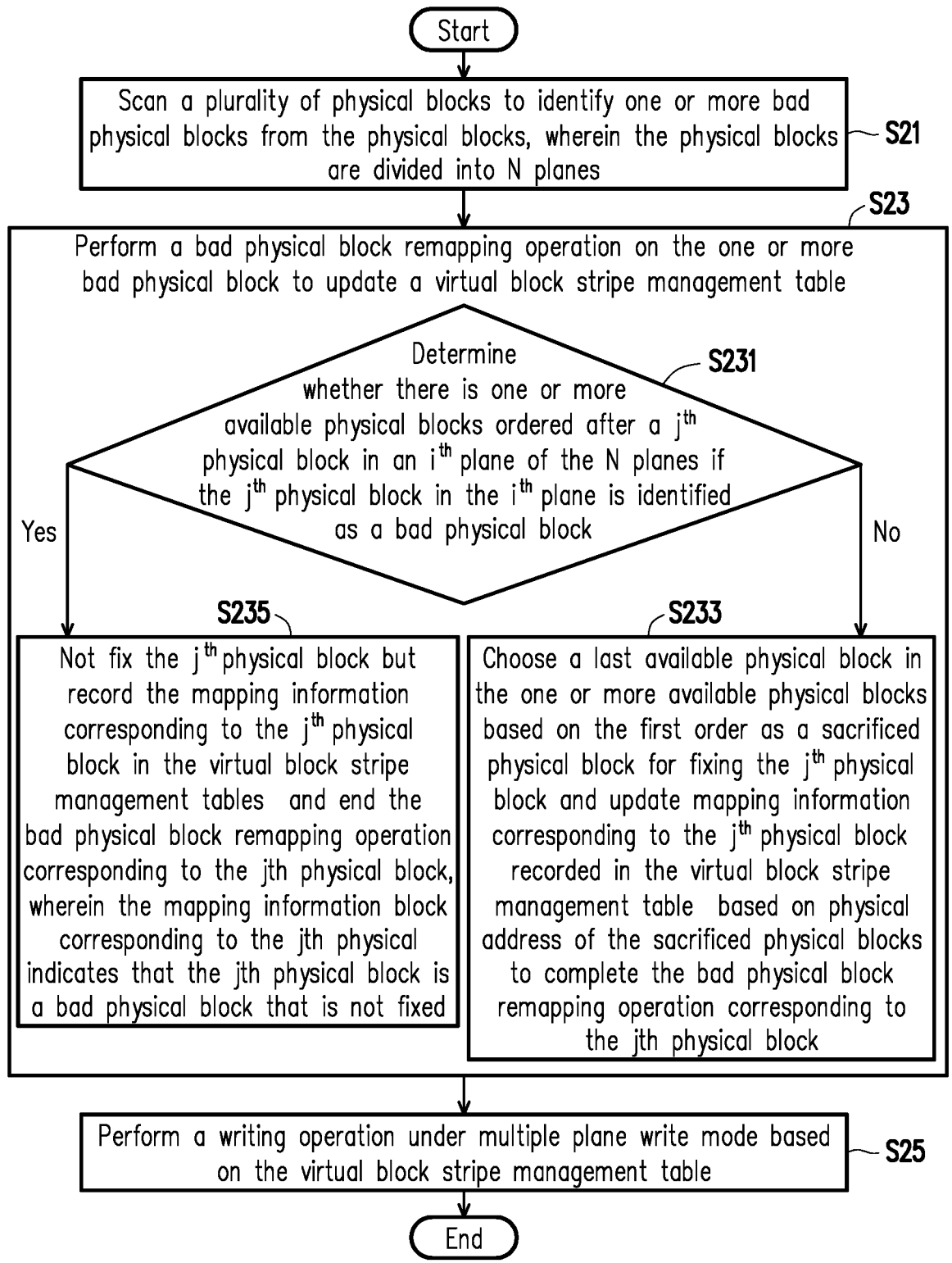
FIG. 2 is a flowchart illustrating a memory management method according to an embodiment of the invention.

FIG. 2 is a flowchart illustrating a decoding method according to an embodiment of the invention. It should be noted that the memory management method shown in FIG. 2 may also be referred to as a bad physical block remapping method. Referring to FIGS. 1 and 2, at Step S21, the block stripe management circuit unit 215 scans a plurality of physical blocks to identify one or more bad physical blocks from the physical blocks. The physical blocks are divided into N planes. Specifically, the processor 211 may instruct the bad block scanning circuit 2151 in the block stripe management circuit unit 215 to perform the bad physical block scanning operation at the above-mentioned timing to identify the bad physical block present in the physical blocks of the rewritable non-volatile memory module 220.

Figure 4A:
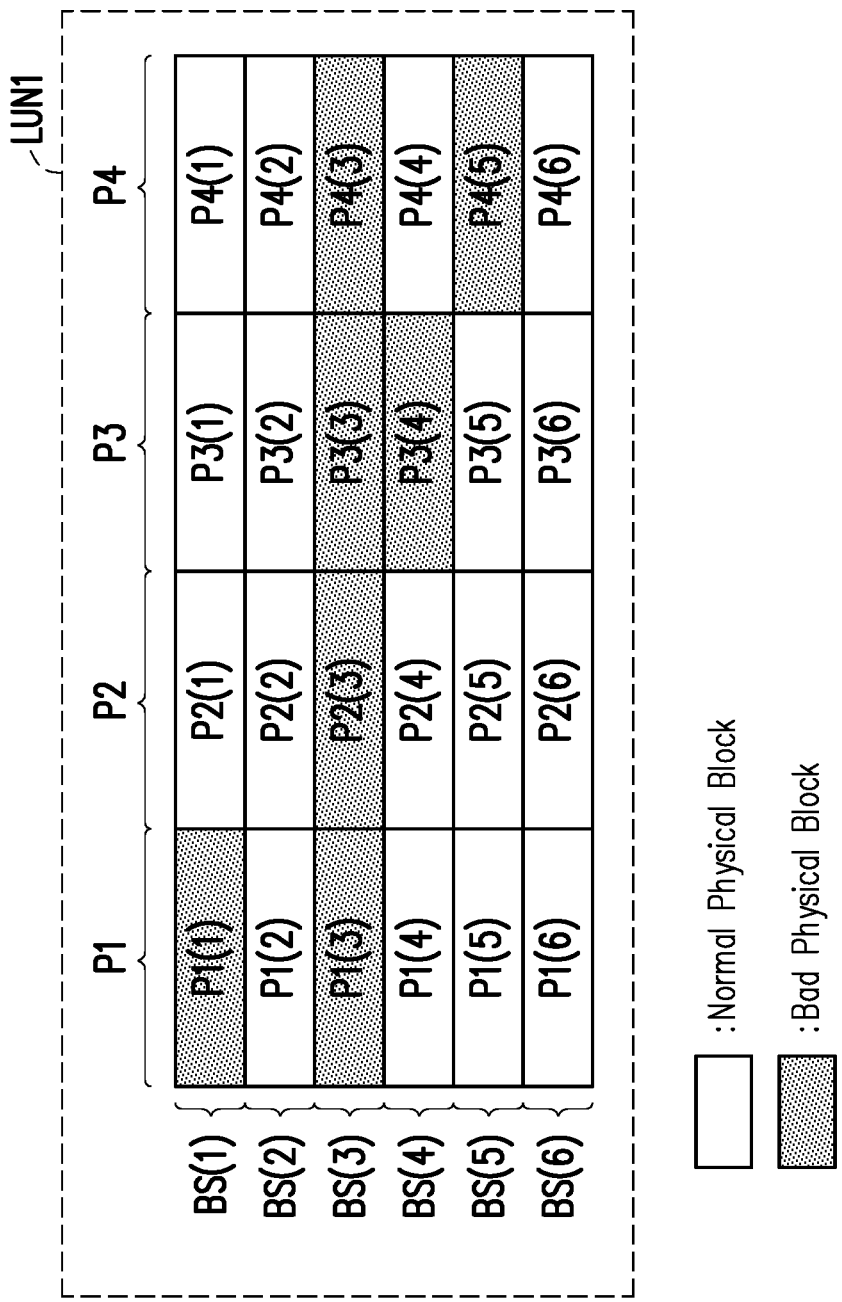
FIG. 4A is a schematic view illustrating a bad physical block according to an embodiment of the invention.
Figure 4B:
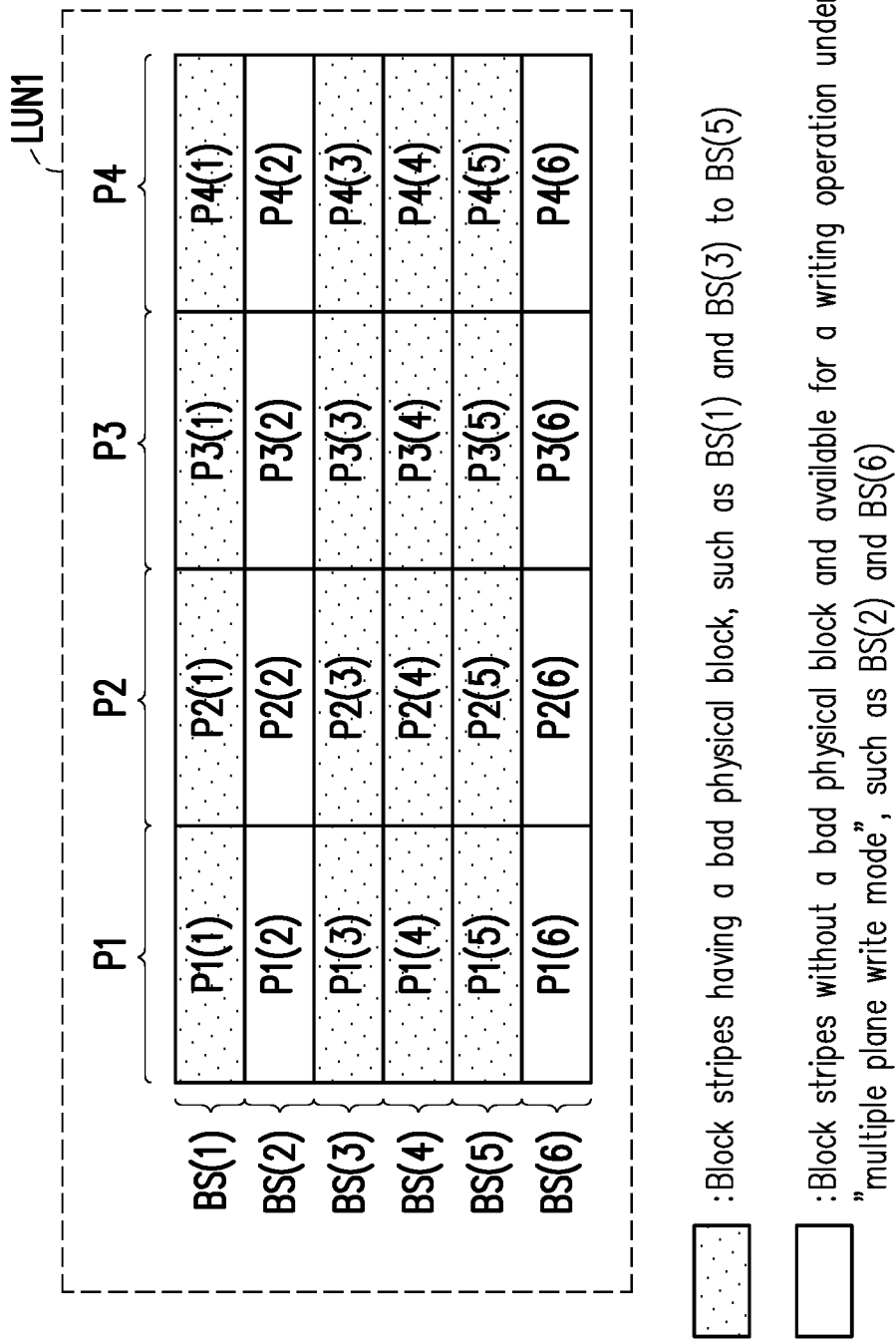
FIG. 4B is a schematic view illustrating a block stripe having a bad physical block according to an embodiment of the invention.

FIG. 4A is a schematic view illustrating a bad physical block according to an embodiment of the invention. FIG. 4B is a schematic view illustrating a block stripe having a bad physical block according to an embodiment of the invention.

For the ease of description, it is assumed that M is 6. In other words, each plane has six physical blocks ordered based on the first order, and there are six block stripes BS(1) to BS(6) in total. In addition, it is assumed that the bad block scanning circuit 2151 identifies bad physical blocks P1(1), P1(3), P2(3), P3(3), P3(4), P4(3), P4(5) (e.g., the grey blocks) by performing the bad physical block scanning operation. Referring to FIG. 4B, the block stripes BS(1), BS(3), BS(4), and BS(5) are unavailable for writing data under the "multiple plane write mode" due to the presence of bad physical blocks. The block stripes BS(1), BS(3), BS(4), and BS(5) may be used to write data under the "single plane write mode". Comparatively, the block stripes BS(2) and BS(6) whose physical blocks are all normal and are available for writing data under the "multiple plane write mode". According to the above example, it is known that even though the number of the bad physical blocks identified are fewer than the number of the normal physical blocks, the presence of the bad physical blocks significantly reduces the number of the block stripes available for writing data under the "multiple plane write mode". As a consequence, the number (e.g., 4) of the block stripes unavailable for the "multiple plane write mode" is even more than the number (e.g., 2) of the block stripes available for the "multiple plane write mode". Hence, the overall data accessing operation becomes less efficient.

Accordingly, the processor 211 may instruct the block stripe management circuit unit 215 to perform the bad physical block remapping operation on the identified bad physical block. In other words, at Step S23, the block stripe management circuit unit 215 may perform the bad physical block remapping operation on the one or more bad physical blocks to update the virtual block stripe management table. Specifically, for each of the identified bad physical blocks, the block stripe management circuit unit 215 may determine whether to perform remapping on the bad physical block to virtually fix the bad physical block and thereby allow a virtual block stripe having the bad physical block to be available for writing data under the multiple plane write mode.

Specifically, Step S23 include Steps S231, S233, and S235. At Step S231, if a $j^{th}$ physical block in an $i^{th}$ plane of the N planes is identified as a bad physical block, the block stripe management circuit 215 (e.g., the mapping table management circuit) may determine whether there is one or more available physical blocks ordered after the $j^{th}$ physical block. i is smaller than or equal to N, and j is smaller than or equal to M. Moreover, in the embodiment, an available physical block is a block that can be configured to be written into, and can be an empty physical block, a physical block full of invalid data, or a physical block containing valid data. If the physical block contains valid data, it needs to perform Garbage Collection operation to move the valid data first to other data block (or an open block), and then perform the bad block remapping. In the embodiment, if the physical block is full of invalid data, the physical block would be performed the erase operation before being programmed data. In some embodiment, if the physical block is full of invalid data, the physical block may be performed the erase operation first, and then perform the bad block remapping.

If it is determined that there is one or more available physical blocks ordered after the $j^{th}$ physical block in the $i^{th}$ plane, the operation proceeds to Step S233, and the block stripe management circuit unit 215 (e.g., the mapping table management circuit 2152) may choose the last available physical block in the one or more available physical blocks based on the first order as a sacrificed physical block for fixing the $j^{th}$ physical block, and update mapping information corresponding to the $j^{th}$ physical block recorded in the virtual block stripe management table based on the physical address of the sacrificed physical block to accomplish the bad physical block remapping operation corresponding to the $j^{th}$ physical block. In addition, the mapping information corresponding to the $j^{th}$ physical block indicates that the physical address of the $j^{th}$ physical block is replaced by the physical addresses of the sacrificed physical block.

Alternatively, if it is determined that there is no one or more available physical blocks ordered after the $j^{th}$ physical block in the $i^{th}$ plane, the operation proceeds to Step S235, and the block stripe management circuit unit 215 (e.g., the mapping table management circuit 2152) does not fix the $j^{th}$ physical block, but records the mapping information corresponding to the $j^{th}$ physical block in the virtual block stripe management table and ends the bad physical block remapping operation corresponding to the $j^{th}$ physical block. The mapping information corresponding to the $j^{th}$ physical block indicates that the $j^{th}$ physical block is a bad physical block that is not fixed. In the following, the bad physical block remapping operation is described in detail with reference to FIG. 5.

Figure 5:
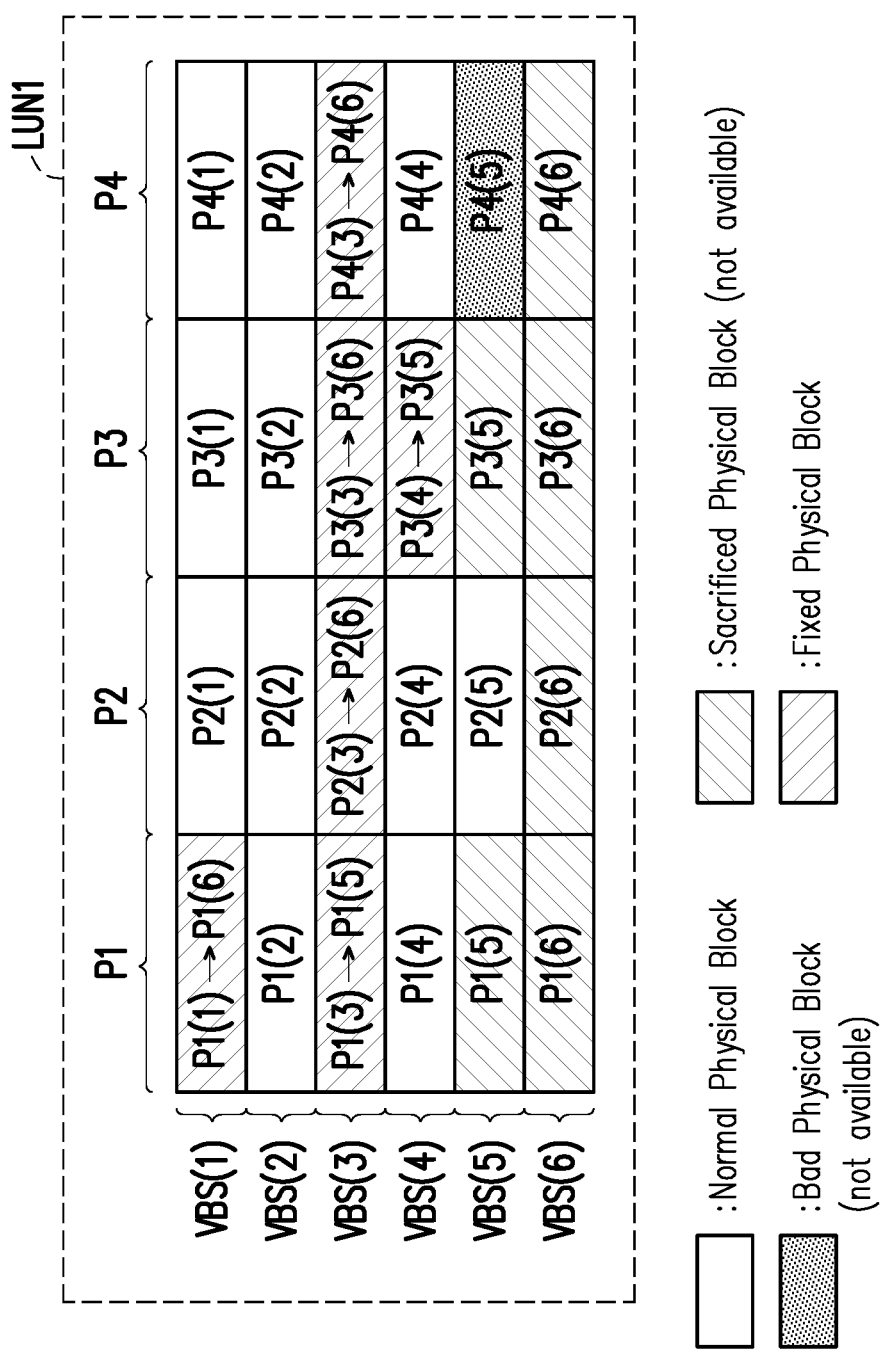
FIG. 5 is a schematic view illustrating a bad physical block re-mapping operation according to an embodiment of the invention.

FIG. 5 is a schematic view illustrating a bad physical block re-mapping operation according to an embodiment of the invention. Referring to FIG. 5, in an example, it is assumed that all the physical blocks are blank. In addition, it is assumed that the management circuit unit 215 performs the bad physical block remapping operation on the physical block P1(1) (i.e., j=1), which is already identified as a bad physical block. First of all, as described in Step S231, the block stripe management circuit unit 215 (e.g., the mapping table management circuit 2152) may determine whether there is any available physical block (i.e., a blank and available physical block) ordered after the physical block P1(1) in the plane P1. In the example, the block stripe management circuit unit 215 may determine that the available physical blocks located in the plane P1 and ordered after the physical block P1(1) based on the first order are the physical blocks P1(2), P1(4), P1(5) and P1(6) (Even though the physical block P1(3) is also blank, the physical block P1(3) is a bad physical block. Therefore, the physical block P1(3) is not an available physical block.

Then, the block stripe management circuit unit 215 may carry out Step S233. In other words, the block stripe management circuit unit 215 may choose the last physical block from the available physical blocks P1(2), P1(4), P1(5), and P1(6) based on the first order as the physical block (also referred to as the sacrificed physical block) for fixing the physical block P1(1). Then, the block stripe management circuit unit 215 (e.g., the mapping table management circuit 2152) may replace the physical address of the physical block P1(1) in the virtual block stripe with the physical address of the chosen sacrificed physical block (e.g., P(1)→P(6) as shown in FIG. 5). After the physical address of the bad physical block P1(1) is replaced by the physical address of the sacrificed physical block P1(6) in the virtual block stripe, the operation may also be construed as that the bad physical block P1(1) is fixed to be a fixed physical block. The block stripe management circuit unit 215 (e.g., the mapping table management circuit 2152) may record the mapping information of the fixed physical block P1(1) in the virtual block stripe management table, and complete the bad physical block remapping operation corresponding to the bad physical block P1(1).

It should be noted that the "fixed" described above is only in a virtual or logical sense, and fixing is carried out by remapping the physical address of the bad physical block to the physical address of a normal and available physical block (the mapping table management circuit 2152 may record the information with the virtual block stripe management table). In other words, any data accessing operation on the physical block P1(1) may be converted into a data access operation on the physical block P1(6). The physical block P1(1) is still damaged physically. It should be noted that, since the physical block P1(6) has become a sacrificed physical block, the physical block P1(6) is no longer determined as "available" (the mapping table management circuit 2152 may record the information in the virtual block stripe management table). A sacrificed physical block may not be determined as an available physical block. A sacrificed physical block in the virtual block stripe management table may be considered as unavailable. In other words, after the sacrificed physical block P1(6) is adopted to fix the bad physical block P1(1), the available physical blocks in the plane P1 are reduced to the physical blocks P1(2), P1(4), and P1(5).

Similarly, regarding the bad physical block remapping operation performed on the bad physical block P1(3), the block stripe management circuit unit 215 (e.g., the mapping table management circuit 2152) may choose the available physical block P1(5) as a sacrificed physical block for fixing the bad physical block P1(3) (e.g., P1(3)→P1(5) as shown in FIG. 5).

Based on the same principle, the physical addresses of the bad physical blocks P2(3), P3(3), P3(4), and P4(3) are all respectively remapped to the physical addresses of the corresponding available physical blocks P2(6), P3(6), P3(5) and P4(6).

It should be noted that, in the bad physical block remapping operation performed on the bad physical block P4(5), since the physical block P4(6) ordered after the bad physical block P4(5) is a sacrificed physical block (instead of an available physical block), the block stripe management circuit unit 215 (e.g., the mapping table management circuit 2152) may determine that there is no available physical block ordered after the bad physical block P4(5) in the plane P4 and carry out Step S235. In other words, the block stripe management circuit unit 215 (e.g., the mapping table management circuit 2152) does not fix the bad physical block P4(5), but records the mapping information corresponding to the bad physical block P4(5) in the virtual block stripe management table and ends the bad physical block remapping operation corresponding to the bad physical block P4(5). In other words, the physical block P4(5) in a virtual block stripe VBS(5) may be labeled as unavailable (labeled as damaged).

After the bad physical block remapping operations on all the identified bad physical blocks are completed, the updating/setting up of the virtual block stripe management table is also completed. After the bad physical block remapping operations on all the identified bad physical blocks are completed, virtual block stripes VBS(1) to VBS(6) and the original block stripes BS(1) to BS(6) show difference in that the virtual block stripes VBS(1) to VBS(4) in the virtual block stripes VBS(1) to VBS(6) do not contain any unavailable physical blocks. The bad physical blocks originally present in the virtual block stripes VBS(1) to VBS(4) are fixed and become fixed physical blocks. More specifically, the block stripe BS(1) originally unavailable for writing data under the "multiple plane write mode" is converted into the virtual block stripe VBS(1), and the virtual block stripe VBS(1) is available for writing data under the "multiple plane write mode". The block stripe BS(3) originally unavailable for writing data under the "multiple plane write mode" is converted into the virtual block stripe VBS(3), and the virtual block stripe VBS(3) is available for writing data under the "multiple plane write mode". The block stripe BS(4) originally unavailable for writing data under the "multiple plane write mode" is converted into the virtual block stripe VBS(4), and the virtual block stripe VBS(4) is available for writing data under the "multiple plane write mode". In addition, in the virtual block stripes VBS(1) to VBS(6), only the virtual block stripes VBS(5) to VBS(6) are unavailable for writing data under the "multiple plane write mode". In other words, by completing all the bad physical block remapping operation, the number of block stripes unavailable for the "multiple plane write mode" is reduced from four to two, and the virtual block stripes available for the "multiple plane write mode" are closely arranged and ranked higher. Therefore, the overall data accessing efficiency of the virtual data stripes VBS(1) to VBS(6) is facilitated (because the more the block stripes available for the multiple plane write mode, the higher the overall data accessing speed).

In the embodiment, the virtual block stripe management table may be classified into a first type and a second type.

Specifically, if the virtual block stripe management table belongs to the first type, the virtual block stripe management table includes a first virtual block stripe bitmap and a first virtual block stripe remapping table. A state column of the first virtual block stripe bitmap records M state values ordered based on the first order and respectively corresponding to the M virtual block stripes. Each of the state values includes: a first type state value, indicating that all the physical blocks in a virtual block stripe corresponding to the first type state value are normal, wherein the first type state value further indicates that the virtual block stripe corresponding to the first type state value does not contain any bad physical block; a second type state value, indicating that a virtual block stripe corresponding to the second type state value contains one or more bad physical blocks fixed through performing the bad physical block remapping operation; a third type state value, indicating that a virtual block stripe corresponding to the third type state value contains one or more unavailable physical blocks; or a fourth type state value, indicating that all the physical blocks in a virtual block stripe corresponding to the fourth type state value are unavailable.

In addition, the first virtual block stripe remapping table includes N plane columns corresponding to the N planes. In addition, each of the N plane columns records the mapping information of the M physical blocks of the corresponding plane based on the first order. Each of the mapping information includes: a first type mapping value, indicating that a physical block corresponding to the first type mapping value is not a bad physical block, wherein the physical address of the physical block corresponding to the first type mapping value is the original physical address; a second type mapping value, indicating that a physical block corresponding to the second type mapping value is a bad physical block on which the bad physical block remapping operation is performed, wherein the second type mapping value further indicates the physical address of the sacrificed physical block for fixing the physical block corresponding to the second type mapping value; a third type mapping value, indicating that a physical block corresponding to the third type state value is a sacrificed physical block and is unavailable; or a fourth type mapping value, indicating that a physical block corresponding to the fourth type state value is a bad physical block on which no bad physical block remapping operation is performed.

If the virtual block stripe management table belongs to the second type, the virtual block stripe management table includes a second virtual block stripe bitmap and a second virtual block stripe remapping table. The second virtual block stripe bitmap includes a state column and an index column. The state column records M state values ordered based on the first order and respectively corresponding to the M virtual block stripes. In addition, the index column records M index values ordered based on the first order and respectively corresponding to the M virtual block stripes. The types of the respective state values are similar to the types of the state values of the virtual block stripe management table of the first type. Therefore, details in this regard will not be repeated in the following. In the M index values, an index value corresponding to the first type state value is a first type index value, and an index value corresponding to the second type state value, the third type state value, or the fourth type state value is a second type index value. In addition, the second type index value includes a positive integer not greater than M. Besides, the second virtual block stripe remapping table includes an index column and N plane columns corresponding to the N planes. The index column records P index values belonging to the second type index value among the M index values recorded in the second virtual block stripe bitmap, wherein P is less than or equal to M. In addition, each of the N plane columns records the mapping information of the P physical blocks of the P virtual block stripes corresponding to the P index values. The respective mapping information is similar to the types of the mapping information of the virtual block stripe management table of the first type. Therefore, details in this regard will not be repeated in the following. The N plane columns of the second virtual block stripe remapping table record a total of N×P mapping information.

In the following, FIG. 6A serves as an example to describe the virtual block stripe management table of the first type, and FIG. 6B serves as an example of the virtual block stripe management table of the second type.

Figure 6A:
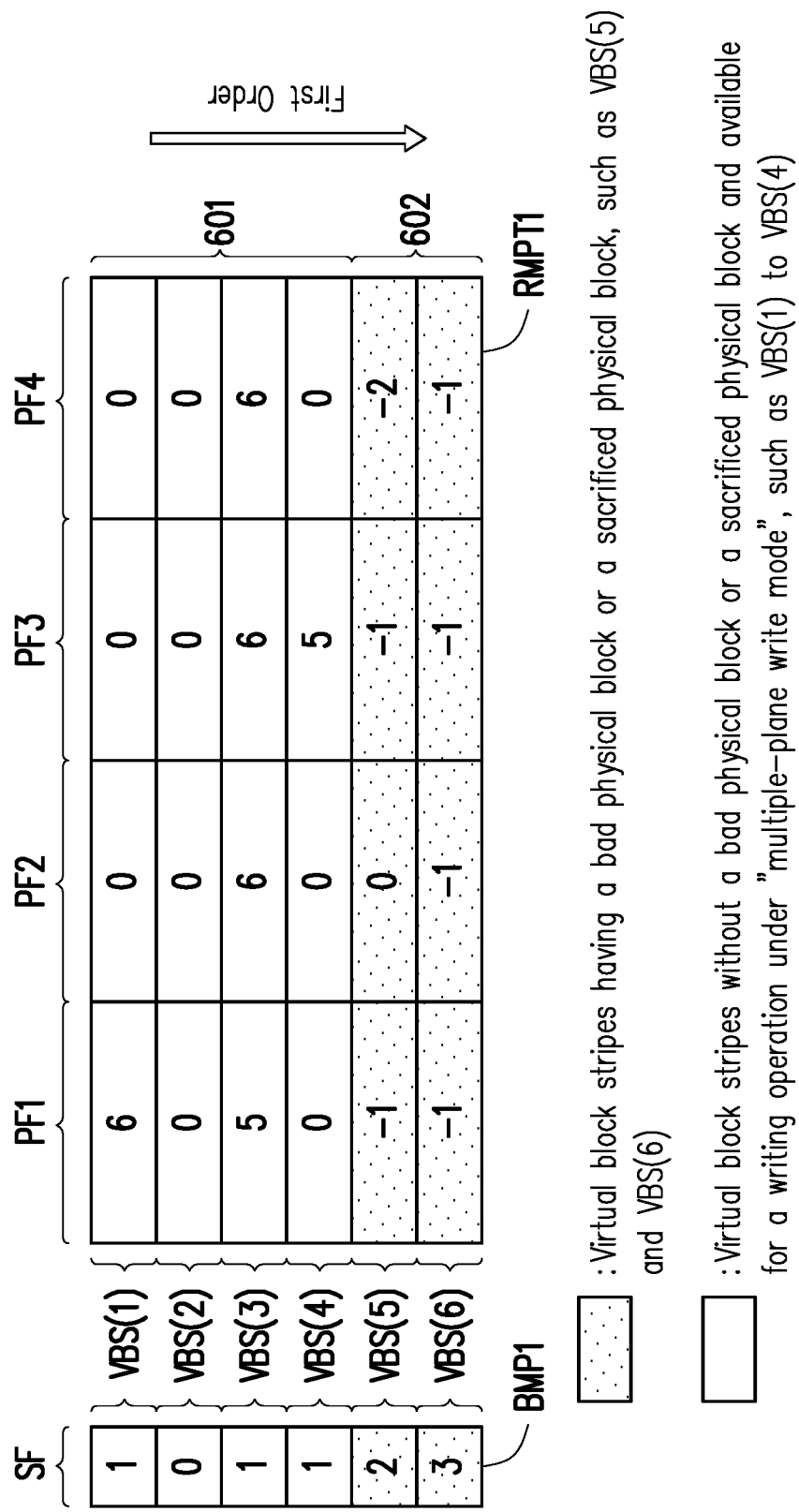
FIG. 6A is a schematic view illustrating a virtual block stripe management table (a first virtual block stripe bitmap and a first virtual block stripe remapping table) according to an embodiment of the invention.

FIG. 6A is a schematic view illustrating a virtual block stripe management table (a first virtual block stripe bitmap and a first virtual block stripe remapping table) according to an embodiment of the invention. Referring to FIG. 6A, following the example of FIG. 5, the virtual block stripe management table of the first type includes a first virtual block stripe bitmap BMP1 and a first virtual block remapping table RMPT1. The first virtual block stripe bitmap BMP1 has a state column SF. The state column SF records six state values (M=6), i.e., "1", "0", "1", "1", "2", and "3" respectively corresponding to the virtual block stripes VBS (1) to VBS(6) based on the first order. According to the above, the mapping table management circuit 2152 may use the first type state value (e.g., the bit value "0") to indicate that all the physical blocks in the corresponding virtual block stripe are normal (no bad physical block at all). For example, the state value corresponding to the virtual block stripe VBS(2) is recorded as "0". The mapping table management circuit 2152 may use the second type state value (e.g., the bit value "1") to indicate that the corresponding virtual block stripe contains at least one fixed physical block. For example, the state values corresponding to the virtual block stripes VBS(1), VBS(3), and VBS(4) are recorded as "1". The mapping table management circuit 2152 may use the third type state value (e.g., the bit value "2") to indicate that the corresponding virtual block stripe has at least one unavailable physical block (e.g., a sacrificed physical block or a bad physical block). For example, the state value corresponding to the virtual block stripe VBS(5) is recorded as "2" (in other words, a virtual block corresponding to the third type state value at least has one unavailable physical block, such as the physical block P2(5)). The mapping table management circuit 2152 may use the fourth type state value (e.g., the bit value "3") to indicate that all the physical blocks in the corresponding virtual block stripe are unavailable physical blocks. For example, the state value corresponding to the virtual block stripe VBS(6) may be recorded as "3" (because the all the physical blocks of the virtual block stripe VBS(6) are unavailable sacrificed physical blocks).

In the embodiment, the processor 211 may quickly determine whether each of the virtual block stripes is available for writing data under the multiple plane write mode based on the first virtual block stripe bitmap. Specifically, the virtual block stripes corresponding to the first type state value and the second type state value (e.g., those covered in a range 601) are determined as being available for writing data under the multiple plane write mode. The virtual block stripes corresponding to the third type state value and the fourth type state value (e.g., those covered in a range 602) may be determined as unavailable for writing data under the multiple plane write mode. It should be noted that a virtual block stripe corresponding to the third type state value may be adopted in a single plane write operation for writing data to the available physical blocks in the virtual block stripe corresponding to the third type state value.

Also, in an embodiment, a virtual block stripe corresponding to the fourth type state value may be skipped from any data accessing operation (because all the physical blocks in the virtual block stripe corresponding to the fourth type state value are unavailable). Accordingly, since the information of the fourth type state value is recorded, the time consumed for some specific memory management operations may be saved (because the virtual block stripe corresponding to the fourth type state value may be ignored when some specific memory management operations are executed).

It should be noted that the order of the state values recorded in the state column SF of the first virtual block stripe bitmap BMP1 is based on the order of the corresponding virtual block stripes. In other words, the virtual block stripe corresponding to a state value can be told based on the ordered position of the state value in the state column. For example, a state value ordered at the $N^{th}$ position may correspond to a virtual block stripe VBS(N). In addition, the first virtual block stripe bitmap BMP may also be integrated into the first virtual block stripe remapping table RMPT1.

The first virtual block remapping table RMPT1 includes four plane columns PF1 to PF4 (N=4) corresponding to the four planes. Each of the plane columns records the mapping information of the physical blocks of the corresponding virtual block stripe based on the first order. For example, the mapping information respectively recorded in the first slots of the plane columns PF1 to PF4 are the mapping information of the physical blocks belonging to the planes P1 to P4 in the virtual block stripe VBS(1).

In the embodiment, the mapping table management circuit 2152 may set the mapping information of physical blocks identified as normal (non-unavailable physical blocks, non-bad physical blocks) as the first type mapping value (e.g., "0") (for example, after the bad physical block scanning operation is performed, the mapping table management circuit 2152 may set the mapping information of the non-bad physical blocks as "0").

In addition, after the bad physical block remapping operation is performed, the mapping table management circuit 2152 may set the mapping information of sacrificed physical blocks in the bad physical block remapping operation as the third type mapping value (e.g., "−1"), and set the mapping information of physical blocks fixed with the sacrificed physical blocks, i.e., the corresponding fixed physical blocks, as the second type mapping value. In addition, the second type mapping value records the ordered position of the sacrificed physical block in the same plane (or the real physical address).

For example, referring to FIGS. 5 and 6A, the bad physical block P1(1) corresponding to the physical block stripe BS(1) in the plane P1 is fixed with the physical block P1(6) (i.e., the physical block ordered sixth in the plane P1). On such basis, the mapping information of the physical block corresponding to the virtual block stripe VBS(1) in the plane column PF1 of the first virtual block stripe remapping table RMPT1 is set as "6", where "6" indicates that the physical block P1(1) is fixed with the physical block P1(6). In addition, the mapping information corresponding to the sacrificed physical block P1(6) in the field column PF1 of the first virtual block stripe remapping table RMPT1 is recorded as "−1". In other words, with the mapping information described above, the processor 211 or the mapping table management circuit 2152 may learn: when a data accessing command instructs to perform data accessing on the physical block P1(1), data cannot be accessed directly at the physical address of the physical block P1(1), but should be accessed at the physical address of the physical block P1(6); and in searching for an available physical block in a data writing operation, the physical block P1(6) may be considered as unavailable.

In the embodiment, the mapping table management circuit 2152 may set the mapping information of a bad physical block (e.g., a bad physical block on which the bad physical block remapping operation is not performed) as the fourth type mapping value (e.g., "−2" or other predetermined negative values). In other words, with the second type mapping value and the fourth type mapping value, the processor 211 or the mapping table management circuit 2152 may identify the real physical addresses of all the bad physical blocks (whether fixed or not) based on the values or positions recorded in the second type mapping value and the fourth type mapping value.

Figure 6B:
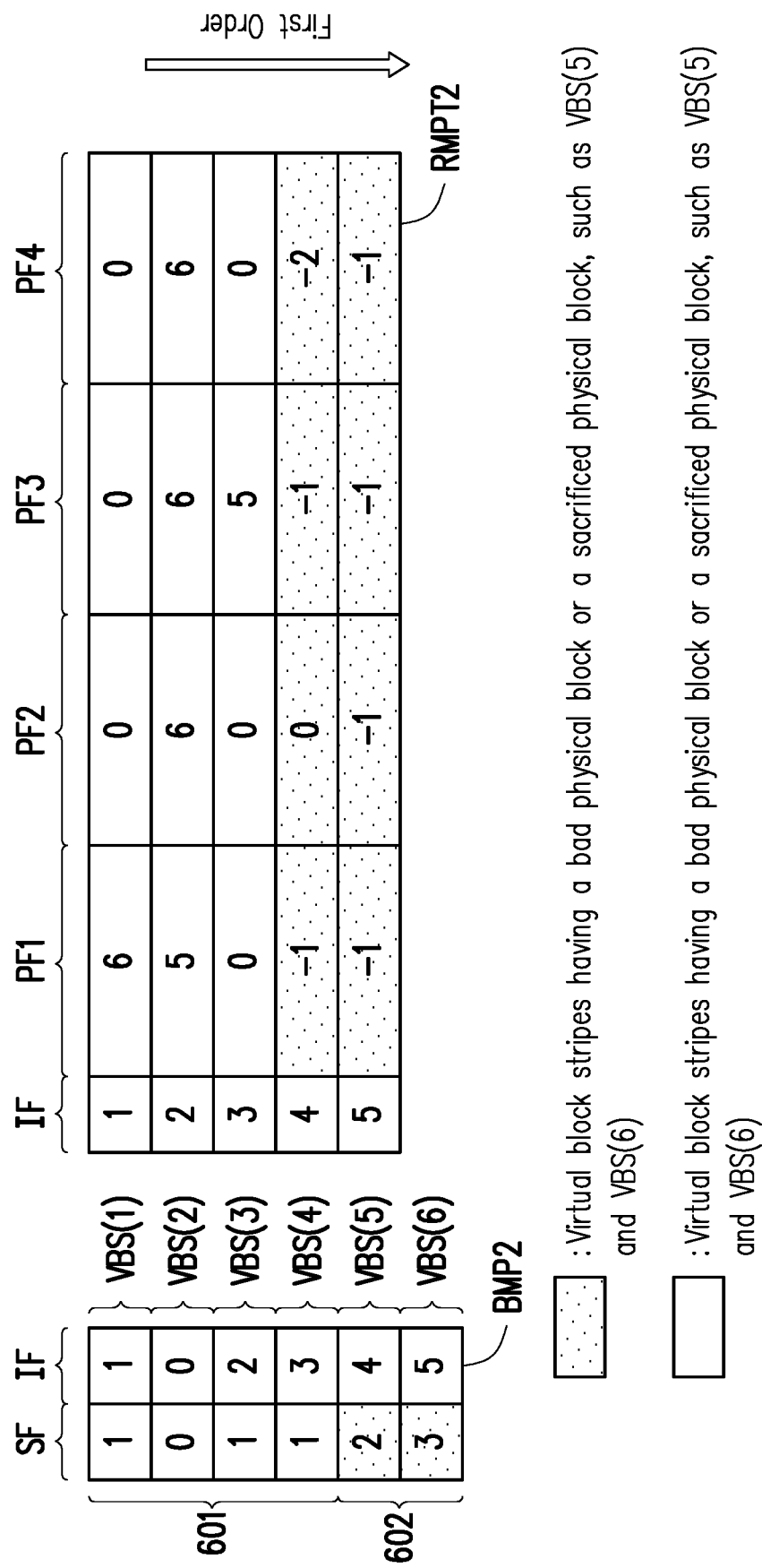
FIG. 6B is a schematic view illustrating a virtual block stripe management table (a second virtual block stripe bitmap and a second virtual block stripe remapping table) according to another embodiment of the invention.

FIG. 6B is a schematic view illustrating a virtual block stripe management table (a second virtual block stripe bitmap and a second virtual block stripe remapping table) according to another embodiment of the invention. FIG. 6B illustrates the virtual block stripe of the second type. The virtual block stripe of the second type differs from the virtual block stripe of the first type in the presence of the index column and that the second virtual block stripe remapping table of the second type has a smaller size than the size of the first virtual block stripe remapping table of the first type. Referring to FIG. 6B, following the example of FIG. 5, the virtual block stripe management table of the second type includes a second virtual block stripe bitmap BMP2 and a second virtual block stripe remapping table RMPT2. The second virtual block stripe bitmap BMP2 includes the state column SF and an index column IF. Similar to the example of FIG. 6A, the state column SF records six state values (M=6) respectively corresponding to the virtual block stripes VBS(1) to VBS(6) based on the first order.

The index column IF records six index values (M=6) based on the first order. In addition, as described above, each index value type is determined based on the type of the state value. For example, the index value of the virtual block stripe VBS(2) corresponds to the state value as "0" (i.e., the first type state value). Therefore, the index value of the virtual block VBS(1) is determined as the first type index value (an index value corresponding to the first type state value is determined as the first type index value). In the embodiment, the value of the first type index value is a predetermined fixed bit value, such as "0" or other suitable bit values. In other words, as long as an index value is determined to be the first type index value, the value of the index value is set as the predetermined fixed bit value, regardless of the ordered position of the index value. In the embodiment, when the processor 211 or the block stripe management circuit unit 215 identifies a virtual block stripe with the first type index value (or the first type state value), the processor 211 or the block stripe management circuit unit 215 may learn that all the physical blocks of the virtual block stripe are normal physical blocks (i.e., physical blocks that are not bad physical blocks, fixed physical blocks or sacrificed physical blocks).

It should be noted that, in the embodiment, values of all the second type index values are assigned in an ascending manner based on the first order. For example, since the state values corresponding to the index values of the virtual block stripes VBS(1), VBS(3), VBS(4), VBS(5), and VBS(6) belong to the second type state value, the third type state value, or the fourth type state value, the index values of the virtual block stripes VBS(1), VBS(3), VBS(4), VBS(5), and VBS(6) are determined as the second type index values. Then, based on the first order, the second index value ordered first is determined as "1", and the second index value ordered $P^{th}$ is determined as "P". For example, in the case of FIG. 6B, P is 5. In other words, the index value of the virtual block stripe VBS(5) is the fifth index value among all the second type index values based on the first order and is set as "5".

The second virtual block stripe remapping table RMPT2 includes the index column IF and the four plane columns PF1 to PF4 corresponding to the four planes. The index column IF records all the second type index values of the second virtual block stripe bitmap BMP2 based on the first order. In other words, the processor 211 or the block stripe management circuit unit 215 may identify an index value in the index column IF of the second virtual block stripe remapping table RMPT2 identical to a specific second type index value in the index column IF of the second virtual block stripe bitmap BMP2, so as to look for the mapping information of the corresponding virtual block stripe in the second virtual block stripe remapping table RMPT2 based on the identical index value. For example, it is assumed that the processor 211 or the block stripe management circuit unit 215 intends to look for the mapping information of all the physical blocks of the virtual block stripe VBS(5). The processor 211 or the block stripe management circuit unit 215 may identify the value of the index value of the virtual block stripe VBS(5) as "4" in the second virtual block stripe bitmap BMP2, and the processor 211 or the block stripe management circuit unit 215 may turn to the index column IF of the second virtual block stripe remapping table RMPT2 and identify the identical index value "4", and identify four mapping information "−1", "0", "4", and "−2" respectively recorded in the plane columns PF1 to PF4.

The types of all the mapping information of the second virtual block stripe remapping table RMPT2 include the first type mapping value, the second type mapping value, the third type mapping value, and the fourth type mapping value of the first virtual block stripe remapping table RMPT1 described above. Therefore, details in this regard will not be repeated in the following.

It should be noted that the mapping information of the physical blocks of the virtual block stripe corresponding to the first type index value is not recorded in the second virtual block stripe remapping table RMPT2. Since all the physical blocks of the virtual block stripe corresponding to the first type index value are normal physical blocks, all the physical addresses of the physical blocks are the originally assigned physical addresses (no remapping). To save space, the mapping information of these physical blocks are not recorded. In other words, the processor 211 or the block stripe management circuit unit 215 adopting the virtual block stripe management table of the second type may identify the ordered position (i.e., the physical address) of the physical block of the virtual block stripe corresponding to the first type index value in a plane based on the ordered position of the virtual block stripe corresponding to the first type index value.

In the embodiment, the processor 211 may quickly determine whether each of the virtual block stripes is available for writing data under the multiple plane write mode based on the first virtual block stripe bitmap. Specifically, the virtual block stripes corresponding to the first type state value and the second type state value are determined as being available for writing data under the multiple plane write mode (e.g., those covered in a range 601). The virtual block stripes corresponding to the third type state value and the fourth type state value may be determined as unavailable for writing data under the multiple plane write mode (e.g., those covered in a range 602). It should be noted that a virtual block stripe corresponding to the third type state value may be adopted in a single plane write operation for writing data to the available physical blocks in the virtual block stripe corresponding to the third type state value.

It should be noted that, in the virtual block stripes obtained after the bad physical block remapping operations, the virtual block stripes available for applying the multiple plane write mode are closely arranged at higher ranked positions. In other words, the virtual block stripes unavailable for applying the multiple plane write mode are ranked lower among all the virtual block stripes. In this way, for sequential data writing or writing of large-volume data, the bad physical blocks in the conventional process may result in fewer and less evenly distributed virtual block stripes available for applying the multiple plane writing. However, in the embodiment, there are more virtual block stripes available for applying multiple plane writing, and these virtual block stripes available are closely arranged and ranked higher. Thus, data writing becomes more efficient, and data integrity also becomes more desirable.

It should be noted that the virtual block stripe management table is maintained in the buffer memory 216 after the storage device 20 is turned on. Also, the virtual block stripe management table is backed up to the rewritable non-volatile memory module 220 at a specific timing. The virtual block stripe management table maintained in the buffer memory 216 may be updated in a timely manner due to a newly identified bad physical block after the corresponding bad physical block remapping operation is completed.

In the embodiment, the updating of the virtual block stripe management table would not affect the updating of the logical to physical addresses mapping table. Specifically, when the processor 211 executes a write command which instructs to write data into first target logical addresses, the processor 211 checks the virtual block stripe management table to find a target virtual block stripe to store the data and identifies first target physical addresses of first target physical blocks in that target virtual block stripe which would be used to store the data. After the data is written into the first target physical addresses, the processor 211 records the first target physical addresses into the logical to physical addresses mapping table to map the first target physical addresses to the first target logical addresses instructed by the write command. It should be noted that the logical to physical addresses mapping table still records the mapping relation of the logical addresses and the physical addresses only (does not record the "virtual" physical addresses). Moreover, when the processor 211 executes a read command which instructs to read data from second target logical addresses, the processor 211 also read the logical to physical addresses mapping table to find the second target physical addresses mapped by the second target logical addresses, and then the process 211 may read the data from the second target physical addresses directly without accessing the virtual block stripe management table.

Figure 7:
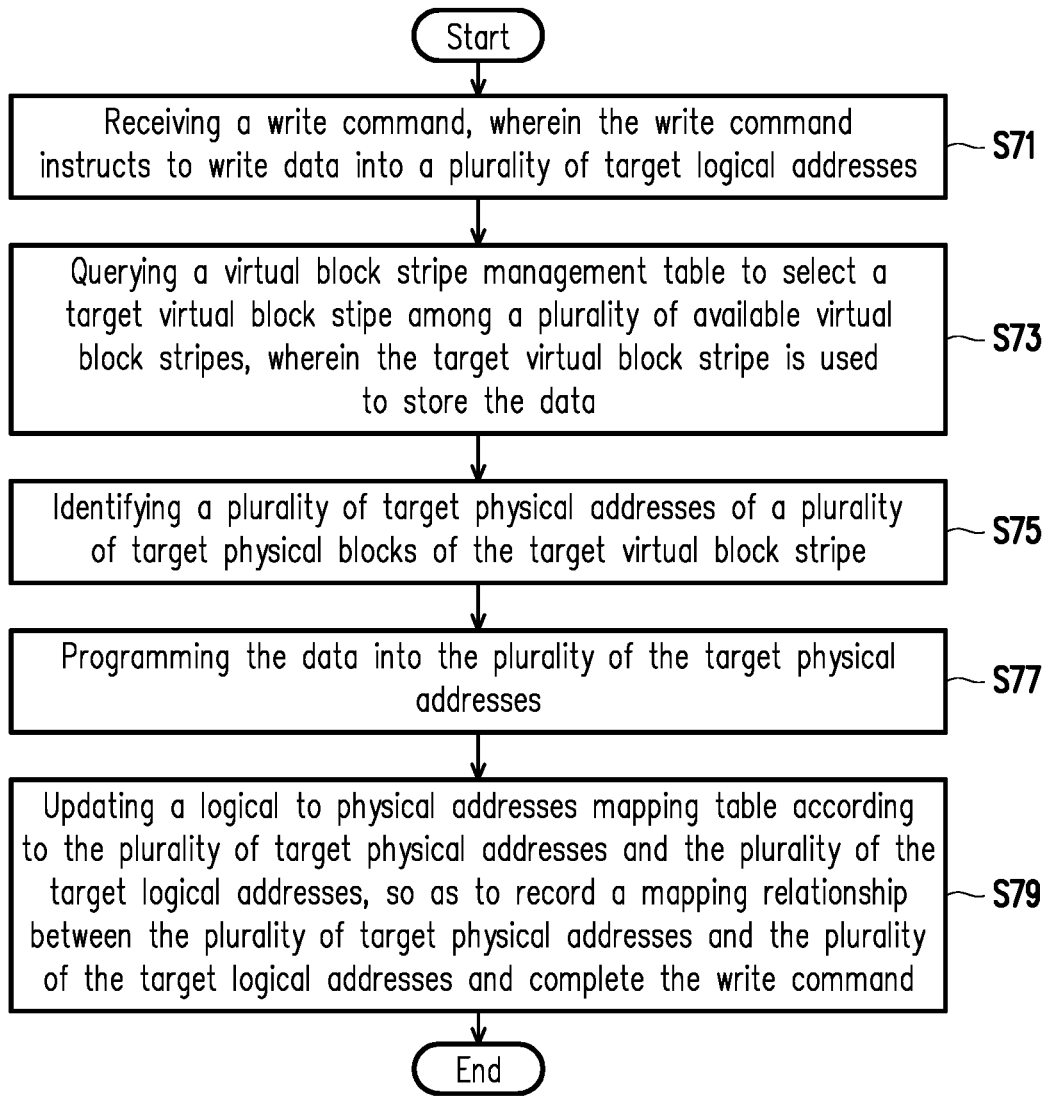
FIG. 7 is a flowchart illustrating a data writing method according to an embodiment of the invention.

For example, please refer FIG. 7, in the step S71, the processor 211 receives a write command, wherein the write command instructs to write data into a plurality of target logical addresses. The write command may be sent from the host system 10. In the step S73, the processor 211 queries a virtual block stripe management table to select a target virtual block stipe among a plurality of available virtual block stripes, wherein the target virtual block stripe is used to store the data. Specifically, the processor 211 may select one available virtual block stripe (i.e., the target virtual block stripe) to write the data with the multiple plane write mode, and the data would be written into the selected virtual block stripe with the multiple plane write mode. In the step S75, the processor 211 identifies a plurality of target physical addresses of a plurality of target physical blocks of the target virtual block stripe. For example, if the selected virtual block stripe is VBS(3), the processor 211 would identify the target physical blocks P1(5), P2(6), P3(6) and P4(6) and the corresponding physical addresses of those physical blocks (e.g., P1(5), P2(6), P3(6) and P4(6)). In the step S77, the processor 211 programs the data into the plurality of the target physical addresses. Next, in the step S79, the processor 211 Updates a logical to physical addresses mapping table according to the plurality of target physical addresses and the plurality of the target logical addresses, so as to record a mapping relationship between the plurality of target physical addresses and the plurality of the target logical addresses and complete the write command. It should be noted that the processor does not need to record the information of the target virtual block into the logical to physical addresses mapping table. The data structures of the logical to physical addresses mapping table and the physical to logical addresses mapping table may be as the same as the conventional art.

It should be noted that the processor 211 or the block stripe management circuit 215 may further record a valid count of each of the virtual block stripes. For example, when the data stored in the physical blocks of a virtual block stripe gets updated with new write data, the processor 211 of the block stripe management circuit unit 215 may deduct one from the valid count of the virtual block stripe to reflect the fact that the amount of valid data stored in the virtual block stripe is reduced. For example, assuming that the processor 211 intends to write data to a logical block, and the logical block already stores old data and is mapped to the physical block P1(6) (i.e., the sixth physical block of the plane P1), the processor 211 may write the data to another available physical block, treat the data of the physical block P1(6) as invalid data (i.e., the data of the physical block P1(6) is updated), and look for the virtual block stripe VBS(1) corresponding to the physical block P1(6) based on the virtual block stripe management table (since the plane column PF1 records the mapping information "6" that is ordered first, and the mapping information corresponds to the virtual block stripe VBS(1)). Accordingly, the processor 211 deducts one from the valid count of the virtual block stripe VBS(1).

When the valid count of a virtual block stripe is lower than a threshold, the processor 211 may perform a garbage collecting operation on the physical units of the virtual block stripe based on the mapping information in the virtual block stripe management table (e.g., the garbage collecting operation performed on a physical block labeled with the second type mapping value is actually performed at the physical address of the corresponding sacrificed physical unit).

It should be noted that, the state values, the index values, and the mapping values above are merely described for an illustrative purpose. With the inspiration above, people having ordinary skills in the art may make suitable modification to record different types of state values, index values, and mapping values by adopting other values.

In an embodiment, the mapping information belonging to the third type mapping value may be recorded as a negative value corresponding to the ordered position of the fixed physical block. For example, assuming that the bad physical block P1(2) is fixed with the physical block P1(5), the physical block P1(5) is thus a sacrificed physical block, and the mapping information thereof is recorded as "−2", indicating that the physical block corresponding to the sacrificed physical block P1(5) is the second physical block in the plane P1 and corresponds to the virtual block stripe VBS(2). It should be noted that, in the embodiment, the mapping information belonging to the fourth type mapping value may be recorded as another specific value.

In view of the foregoing, the embodiments of the invention provide the memory management method and the storage controller capable of scanning and identifying a bad physical block, performing the bad physical block remapping operation on the identified bad physical block to update the virtual block stripe management table, and perform a writing operation under the multiple plane write mode based on the virtual block stripe management table, so as to generate multiple virtual block stripes available for the multiple plane write mode. Accordingly, the data accessing efficiency and the space of the storage device are increased.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A memory management method for a storage device having a rewritable non-volatile memory module, wherein the rewritable non-volatile memory module has a plurality of physical blocks, the physical blocks are divided into N planes, each of the N planes has M physical blocks corresponding to M block stripes and ordered based on a first order, M and N being positive integers, and the memory management method comprising:
    scanning the physical blocks to identify one or more bad physical blocks in a block stripe among the M block stripes, wherein each of the M block stripes includes N physical blocks in the N planes ordered at a same position in the first order;
    performing a bad physical block remapping operation on the one or more bad physical blocks to update a virtual block stripe management table to fix the one or more bad physical blocks in the block stripe to generate a fixed block stripe, wherein the fixed block stripe does not contain any unavailable physical block; and
    performing a first writing operation under a multiple plane write mode based on the updated virtual block stripe management table; and
    performing a writing operation under a single plane write mode based on the updated virtual block stripe management table,
    wherein the bad physical block remapping operation comprises:
        determining whether there is one or more available physical blocks ordered after a $j^{th}$ physical block in an $i^{th}$ plane of the N planes if the $j^{th}$ physical block in the $i^{th}$ plane is identified as a bad physical block, wherein i is a positive integer less than or equal to N, and j is a positive integer less than or equal to M,
    wherein in response to determining that there are the one or more available physical blocks ordered after the $j^{th}$ physical block in the $i^{th}$ plane, a last available physical block in the one or more available physical blocks is chosen based on the first order as a sacrificed physical block for fixing the $j^{th}$ physical block, and mapping information corresponding to the $j^{th}$ physical block recorded in the virtual block stripe management table is updated based on a physical address of the sacrificed physical block to complete the bad physical block remapping operation corresponding to the $j^{th}$ physical block, wherein the mapping information corresponding to the $j^{th}$ physical block indicates that a physical address of the $j^{th}$ physical block is replaced by the physical address of the sacrificed physical block,
    wherein after performing the bad physical block remapping operation, block stripes that are available for the multiple plane write mode among the M block stripes are arranged at higher ranked positions in first order than block stripes that are unavailable for the multiple plane write mode among the M block stripes,
    wherein the block stripes that are unavailable for the multiple plane write mode includes a sacrificed block stripe that includes the sacrificed physical block, and the writing operation under the single plane write mode is performed to an available physical block of the sacrificed block stripe,
    wherein performing the first writing operation under the multiple plane write mode based on the updated virtual block stripe management table comprises:
        identifying write data corresponding to the first writing operation;
        dividing the write data to N pieces of target write data corresponding to the N target physical blocks in the fixed block stripe; and
        simultaneously performing sub-writing operations to write simultaneously the N pieces of target write data to the N target physical blocks of the fixed block stripe respectively, wherein a size of the N pieces target write data is less than or equal to a total capacity of the N target physical blocks.

2. The memory management method as claimed in claim 1,
    wherein if the virtual block stripe management table belongs to a first type, the virtual block stripe management table comprises a first virtual block stripe bitmap and a first virtual block stripe remapping table, wherein a state column of the first virtual block stripe bitmap records M state values ordered based on the first order and respectively corresponding to M virtual block stripes, wherein each of the M state values comprises:
- a first type state value, indicating that all physical blocks in a virtual block stripe corresponding to the first type state value are normal, wherein the first type state value further indicates that the virtual block stripe corresponding to the first type state value does not contain any bad physical block;
- a second type state value, indicating that a virtual block stripe corresponding to the second type state value contains one or more bad physical blocks fixed through performing the bad physical block remapping operation;
- a third type state value, indicating that a virtual block stripe corresponding to the third type state value contains one or more physical blocks that are unavailable; or
- a fourth type state value, indicating that all physical blocks of a virtual block stripe corresponding to the fourth type state value are unavailable, wherein the first virtual block stripe remapping table comprises N plane columns corresponding to the N planes, wherein each of the N plane columns records mapping information of M physical blocks of a corresponding plane based on the first order, wherein each of the mapping information of the M physical blocks comprises:
- a first type mapping value, indicating that a physical block corresponding to the first type mapping value is not the bad physical block, and a physical address of the physical block corresponding to the first type mapping value is an original physical address;
- a second type mapping value, indicating that a physical block corresponding to the second type mapping value is a bad physical block on which the bad physical block remapping operation is performed, wherein the second type mapping value further indicates a physical address of a sacrificed physical block for fixing the physical block corresponding to the second type mapping value;
- a third type mapping value, indicating that a physical block corresponding to the third type state value is a sacrificed physical block and is unavailable; or
- a fourth type mapping value, indicating that a physical block corresponding to the fourth type state value is a bad physical block on which the bad physical block remapping operation is not performed.

3. The memory management method as claimed in claim 1,
wherein if the virtual block stripe management table belongs to a second type, the virtual block stripe management table comprises a second virtual block stripe bitmap and a second virtual block stripe remapping table, wherein the second virtual block stripe bitmap comprises a state column and an index column, the state column records M state values ordered based on the first order and respectively corresponding to M virtual block stripes, and the index column records M index values ordered based on the first order and respectively corresponding to the M virtual block stripes, wherein each of the M state values comprises:
- a first type state value, indicating that all physical blocks in a virtual block stripe corresponding to the first type state value are normal, wherein the first type state value further indicates that the virtual block stripe corresponding to the first type state value does not contain any bad physical block;
- a second type state value, indicating that a virtual block stripe corresponding to the second type state value contains one or more bad physical blocks fixed through performing the bad physical block remapping operation;
- a third type state value, indicating that a virtual block stripe corresponding to the third type state value contains one or more physical blocks that are unavailable; or
- a fourth type state value, indicating that all physical blocks of a virtual block stripe corresponding to the fourth type state value are unavailable, wherein in the M index values, an index value corresponding to the first type state value is a first type index value, and an index value corresponding to the second type state value, the third type state value, or the fourth type state value is a second type index value, wherein the second type index value comprises a positive integer not greater than M, wherein the second virtual block stripe remapping table comprises an index column and N plane columns corresponding to the N planes, the index column records P index values belonging to the second type index value among the M index values in the second virtual block stripe bitmap, P being less than or equal to M, wherein each plane column of the N plane columns records mapping information of P physical blocks of P virtual block stripes corresponding to the P index values, wherein each of the mapping information of the M physical blocks comprises:
- a first type mapping value, indicating that a physical block corresponding to the first type mapping value is not the bad physical block, and a physical address of the physical block corresponding to the first type mapping value is an original physical address;
- a second type mapping value, indicating that a physical block corresponding to the second type mapping value is a bad physical block on which the bad physical block remapping operation is performed, wherein the second type mapping value further indicates a physical address of a sacrificed physical block for fixing the physical block corresponding to the second type mapping value;
- a third type mapping value, indicating that a physical block corresponding to the third type state value is a sacrificed physical block and is unavailable; and
- a fourth type mapping value, indicating that a physical block corresponding to the fourth type state value is a bad physical block on which the bad physical block remapping operation is not performed, wherein the N plane columns of the second virtual block stripe remapping table records a total of N×P mapping information.

4. The memory management method as claimed in claim 1, further comprising:
not fixing the $j^{th}$ physical block but recording the mapping information corresponding to the $j^{th}$ physical block in the virtual block stripe management table and ending the bad physical block remapping operation corresponding to the $j^{th}$ physical block in response to determining that there is no one or more physical blocks that are available and ordered after the $j^{th}$ physical block in the $i^{th}$ plane, wherein the mapping information corresponding to the $j^{th}$ physical block indicates that the $j^{th}$ physical block is a bad physical block that is not fixed.

5. The memory management method as claimed in claim 1, further comprising:
not setting up a bad physical block table after the one or more bad physical blocks are identified, wherein physical addresses of the one or more bad physical blocks are identified by the virtual block stripe management table.

6. The memory management method as claimed in claim 1, further comprising:
performing a second writing operation under the multiple plane write mode based on the virtual block stripe management table, comprises:
identifying write data corresponding to the second writing operation;
identifying one or more first virtual block stripes based on the virtual block stripe management table, wherein the one or more first virtual block stripes do not contain any unavailable physical block; and
choosing a blank target virtual block stripe from the one or more first virtual block stripes, wherein the blank target virtual block stripe includes N target physical blocks corresponding to the N planes;
dividing the write data to N pieces of target write data corresponding to the N target physical blocks in the blank target virtual block stripe; and
simultaneously performing sub-writing operations to simultaneously write the N pieces of the target write data to the N target physical blocks of the blank target virtual block stripe respectively, wherein a size of the N pieces of the target write data is less than or equal to a total capacity of the N target physical blocks.

7. The memory management method as claimed in claim 6, wherein writing simultaneously the N pieces of the target write data to the N target physical blocks of the blank target virtual block stripe respectively comprises:
identifying N mapping information corresponding to the N target physical blocks from the virtual block stripe management table based on the blank target virtual block stripe; and
identifying N physical addresses respectively belonging to the N planes based on the N mapping information, so as to simultaneously write the N pieces of the target write data to the N physical addresses.

8. The memory management method as claimed in claim 6, wherein the writing further comprises:
identifying an old virtual block stripe corresponding to old data based on the virtual block stripe management table after the second writing operation is performed if a logical address corresponding to the second writing operation already stores the old data; and
updating a valid data count of the old virtual block stripe.

9. A storage controller, controlling a storage device comprising a rewritable non-volatile memory module, the storage controller comprising:
a connection interface circuit, coupled to a host system;
a memory interface control circuit, coupled to the rewritable non-volatile memory module, wherein the rewritable non-volatile memory module has a plurality of physical blocks, the physical blocks are divided into N planes, and each of the N planes has M physical blocks corresponding to M block stripes and ordered based on a first order, M and N being positive integers;
a block stripe management circuit unit; and
a processor, coupled to the connection interface circuit, the memory interface control circuit, and the block stripe management circuit unit,
wherein the block stripe management circuit unit scans the physical blocks to identify one or more bad physical blocks in a block stripe among the M block stripes, wherein each of the M block stripes includes N physical blocks in the N planes ordered at a same position in the first order,
wherein the block stripe management circuit unit further performs a bad physical block remapping operation on the one or more bad physical blocks to update a virtual block stripe management table to fix the one or more bad physical blocks in the block stripe to generate a fixed block stripe, wherein the fixed block stripe does not contain any unavailable physical block,
wherein the processor instructs the memory interface control circuit to perform a first writing operation under a multiple plane write mode based on the updated virtual block stripe management table,
wherein the processor instructs the memory interface control circuit to perform a writing operation under a single plane write mode based on the updated virtual block stripe management table,
wherein the bad physical block remapping operation comprises:
determining whether there is one or more available physical blocks ordered after a $j^{th}$ physical block in an $i^{th}$ plane of the N planes by the block stripe management circuit unit if the $j^{th}$ physical block in the $i^{th}$ plane is identified as a bad physical block, wherein i is a positive integer less than or equal to N, and j is a positive integer less than or equal to M,
wherein in response to determining that there are the one or more available physical blocks ordered after the $j^{th}$ physical block in the $i^{th}$ plane, the block stripe management circuit unit chooses a last available physical block in the one or more available physical blocks based on the first order as a sacrificed physical block for fixing the $j^{th}$ physical block, and updates mapping information corresponding to the $j^{th}$ physical block recorded in the virtual block stripe management table based on a physical address of the sacrificed physical block to complete the bad physical block remapping operation corresponding to the $j^{th}$ physical block, wherein the mapping information corresponding to the $j^{th}$ physical block indicates that a physical address of the $j^{th}$ physical block is replaced by the physical address of the sacrificed physical block,
wherein after performing the bad physical block remapping operation, block stripes that are available for the multiple plane write mode among the M block stripes are arranged at higher ranked positions in first order than block stripes that are unavailable for the multiple plane write mode among the M block stripes,
wherein the block stripes that are unavailable for the multiple plane write mode includes a sacrificed block stripe that includes the sacrificed physical block, and the writing operation under the single plane write mode is performed to an available physical block of the sacrificed block stripe,
wherein in the operation that the processor instructs the memory interface control circuit to perform the first writing operation under the multiple plane write mode based on the updated virtual block stripe management table, the processor identifies write data corresponding to the first writing operation, wherein the processor divides the write data to N pieces of target write data corresponding to the N target physical blocks in the fixed block stripe; and wherein the processor instructs the memory interface control circuit to simultaneously performing sub-writing operations to write simultaneously the N pieces of target write data to the N target physical blocks of the fixed block stripe respectively, wherein a size of the N pieces of the target write data is less than or equal to a total capacity of the N target physical blocks.

10. The storage controller as claimed in claim 9, wherein:

wherein if the virtual block stripe management table belongs to a first type, the virtual block stripe management table comprises a first virtual block stripe bitmap and a first virtual block stripe remapping table, wherein a state column of the first virtual block stripe bitmap records M state values ordered based on the first order and respectively corresponding to M virtual block stripes, wherein each of the M state values comprises:
 a first type state value, indicating that all physical blocks in a virtual block stripe corresponding to the first type state value are normal, wherein the first type state value further indicates that the virtual block stripe corresponding to the first type state value does not contain any bad physical block;
 a second type state value, indicating that a virtual block stripe corresponding to the second type state value contains one or more bad physical blocks fixed through performing the bad physical block remapping operation;
 a third type state value, indicating that a virtual block stripe corresponding to the third type state value contains one or more physical blocks that are unavailable; or
 a fourth type state value, indicating that all physical blocks of a virtual block stripe corresponding to the fourth type state value are unavailable, wherein the first virtual block stripe remapping table comprises N plane columns corresponding to the N planes, wherein each of the N plane columns records mapping information of M physical blocks of a corresponding plane based on the first order, wherein each of the mapping information of the M physical blocks comprises:
 a first type mapping value, indicating that a physical block corresponding to the first type mapping value is not the bad physical block, and a physical address of the physical block corresponding to the first type mapping value is an original physical address;
 a second type mapping value, indicating that a physical block corresponding to the second type mapping value is a bad physical block on which the bad physical block remapping operation is performed, wherein the second type mapping value further indicates a physical address of a sacrificed physical block for fixing the physical block corresponding to the second type mapping value;
 a third type mapping value, indicating that a physical block corresponding to the third type state value is a sacrificed physical block and is unavailable; or
 a fourth type mapping value, indicating that a physical block corresponding to the fourth type state value is a bad physical block on which the bad physical block remapping operation is not performed.

11. The storage controller as claimed in claim 9, wherein:

wherein if the virtual block stripe management table belongs to a second type, the virtual block stripe management table comprises a second virtual block stripe bitmap and a second virtual block stripe remapping table, wherein the second virtual block stripe bitmap comprises a state column and an index column, the state column records M state values ordered based on the first order and respectively corresponding to M virtual block stripes, and the index column records M index values ordered based on the first order and respectively corresponding to the M virtual block stripes, wherein each of the M state values comprises:
 a first type state value, indicating that all physical blocks in a virtual block stripe corresponding to the first type state value are normal, wherein the first type state value further indicates that the virtual block stripe corresponding to the first type state value does not contain any bad physical block;
 a second type state value, indicating that a virtual block stripe corresponding to the second type state value contains one or more bad physical blocks fixed through performing the bad physical block remapping operation;
 a third type state value, indicating that a virtual block stripe corresponding to the third type state value contains one or more physical blocks that are unavailable; or
 a fourth type state value, indicating that all physical blocks of a virtual block stripe corresponding to the fourth type state value are unavailable, wherein in the M index values, an index value corresponding to the first type state value is a first type index value, and an index value corresponding to the second type state value, the third type state value, or the fourth type state value is a second type index value, wherein the second type index value comprises a positive integer not greater than M, wherein the second virtual block stripe remapping table comprises an index column and N plane columns corresponding to the N planes, the index column records P index values belonging to the second type index value among the M index values in the second virtual block stripe bitmap, P being less than or equal to M, wherein each plane column of the N plane columns records mapping information of P physical blocks of P virtual block stripes corresponding to the P index values, wherein each of the mapping information of the M physical blocks comprises:
 a first type mapping value, indicating that a physical block corresponding to the first type mapping value is not the bad physical block, and a physical address of the physical block corresponding to the first type mapping value is an original physical address;
 a second type mapping value, indicating that a physical block corresponding to the second type mapping value is a bad physical block on which the bad physical block remapping operation is performed, wherein the second type mapping value further indicates a physical address of a sacrificed physical block for fixing the physical block corresponding to the second type mapping value;

a third type mapping value, indicating that a physical block corresponding to the third type state value is a sacrificed physical block and is unavailable; and a fourth type mapping value, indicating that a physical block corresponding to the fourth type state value is a bad physical block on which the bad physical block remapping operation is not performed, wherein the N plane columns of the second virtual block stripe remapping table records a total of N×P mapping information.

12. The storage controller as claimed in claim 9, wherein: the block stripe management circuit unit does not fix the $j^{th}$ physical block but records the mapping information corresponding to the $j^{th}$ physical block in the virtual block stripe management table and ends the bad physical block remapping operation corresponding to the $j^{th}$ physical block in response to determining that there is no one or more physical blocks that are available and ordered after the $j^{th}$ physical block in the $i^{th}$ plane, wherein the mapping information corresponding to the $j^{th}$ physical block indicates that the $j^{th}$ physical block is a bad physical block that is not fixed.

13. The storage controller as claimed in claim 9, wherein: wherein after the one or more bad physical blocks are identified, the processor does not set up a bad physical block table, and the processor identifies physical addresses of the one or more bad physical blocks based on the virtual block stripe management table.

14. The storage controller as claimed in claim 9, wherein in the operation that the processor instructs the memory interface control circuit to perform a second writing operation under the multiple plane write mode based on the virtual block stripe management table, the processor identifies write data corresponding to the second writing operation, wherein the processor identifies one or more first virtual block stripes based on the virtual block stripe management table, and the one or more first virtual block stripes do not contain any unavailable physical block, wherein the processor chooses a blank target virtual block stripe from the one or more first virtual block stripes, wherein the blank target virtual block stripe includes N target physical blocks corresponding to the N planes;

wherein the processor divides the write data to N pieces of target write data corresponding to the N target physical blocks in the blank target virtual block stripe; and wherein the processor instructs the memory interface control circuit to simultaneously write the N pieces of the target write data to the N target physical blocks of the blank target virtual block stripe respectively, wherein a size of the N pieces of the target write data is less than or equal to a total capacity of the N target physical blocks.

15. The storage controller as claimed in claim 14, wherein in the operation of instructing the memory interface control circuit to simultaneously write the N pieces of the target write data to the N target physical blocks of the blank target virtual block stripe respectively, the processor identifies N mapping information corresponding to the N target physical blocks from the virtual block stripe management table based on the blank target virtual block stripe, wherein the processor identifies N physical addresses respectively belonging to the N planes based on the N mapping information, so as to instruct the memory interface control circuit to simultaneously write the N pieces of the target write data to the N physical addresses.

16. The storage controller as claimed in claim 14, wherein:

the processor identifies an old virtual block stripe corresponding to old data based on the virtual block stripe management table after the second writing operation is performed if a logical address corresponding to the second writing operation already stores the old data, wherein the processor updates a valid data count of the old virtual block stripe.

* * * * *